US010030756B2

(12) United States Patent
Wilkens

(10) Patent No.: US 10,030,756 B2
(45) Date of Patent: Jul. 24, 2018

(54) AUTOMATIC FLIGHT CONTROL ACTUATOR SYSTEMS

(71) Applicant: HONEYWELL INTERNATIONAL INC., Morris Plains, NJ (US)

(72) Inventor: Dean Wilkens, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 228 days.

(21) Appl. No.: 15/171,733

(22) Filed: Jun. 2, 2016

(65) Prior Publication Data

US 2017/0350491 A1    Dec. 7, 2017

(51) Int. Cl.
| | | |
|---|---|---|
| *F16H 35/00* | (2006.01) | |
| *F16H 49/00* | (2006.01) | |
| *B64C 13/18* | (2006.01) | |
| *B64C 13/04* | (2006.01) | |
| *B64C 13/28* | (2006.01) | |
| *B64C 27/605* | (2006.01) | |

(52) U.S. Cl.
CPC ........... *F16H 49/001* (2013.01); *B64C 13/04* (2013.01); *B64C 13/18* (2013.01); *B64C 13/28* (2013.01); *B64C 27/605* (2013.01)

(58) Field of Classification Search
USPC .......................................................... 74/640
See application file for complete search history.

(56) References Cited

U.S. PATENT DOCUMENTS

| | | |
|---|---|---|
| 2,877,968 A | 3/1959 | Granan et al. |
| 3,265,332 A | 8/1966 | Rasmussen |
| 4,094,481 A | 6/1978 | DeWalt |
| 4,274,808 A | 6/1981 | Garner et al. |
| 4,345,195 A | 8/1982 | Griffith et al. |
| 4,512,710 A | 4/1985 | Flatau |

(Continued)

FOREIGN PATENT DOCUMENTS

| | | |
|---|---|---|
| CN | 102730186 A | 10/2012 |
| EP | 0990819 A1 | 4/2000 |

(Continued)

OTHER PUBLICATIONS

Wilkens, Dean; Automatic Flight Control Actuator Systems, U.S. Appl. No. 14/886,801, filed Oct. 19, 2015.

(Continued)

*Primary Examiner* — Ha Dinh Ho
(74) *Attorney, Agent, or Firm* — Lorenz & Kopf, LLP

(57) ABSTRACT

An automatic actuator system is provided. The automatic actuator system includes an input linkage that receives an input and an output linkage adapted to control a flight surface actuator. The automatic actuator system includes a first strain wave gear having a first circular spline coupled to the input linkage and a first flex spline rotatably coupled to the first circular spline. The automatic actuator system includes a second strain wave gear having a second circular spline coupled to the first flex spline. The second strain wave gear includes a second flex spline, and the second flex spline is coupled to the output linkage such that at least a portion of the input from the input linkage is transferred to the output linkage via the first strain wave gear and the second strain wave gear.

20 Claims, 10 Drawing Sheets

(56) References Cited

U.S. PATENT DOCUMENTS

| | | | | |
|---|---|---|---|---|
| 4,716,785 | A | * | 1/1988 | Godai .................... B25J 9/0081 74/606 R |
| 5,178,031 | A | * | 1/1993 | Orsi ....................... B25J 9/1025 318/568.11 |
| 5,201,239 | A | * | 4/1993 | Bundo ................... B25J 9/0009 74/479.01 |
| 5,634,373 | A | * | 6/1997 | Cuffe ...................... F16H 25/20 74/640 |
| 5,816,117 | A | | 10/1998 | Berry et al. |
| 6,269,711 | B1 | * | 8/2001 | Tejima ................. F16H 49/001 384/512 |
| 6,573,672 | B2 | | 6/2003 | O'Rourke et al. |
| 8,084,972 | B2 | | 12/2011 | Strong et al. |
| 8,534,155 | B2 | * | 9/2013 | Long ........................ B25J 9/103 74/490.01 |
| 8,628,046 | B2 | | 1/2014 | Grohmann et al. |
| 8,888,036 | B2 | | 11/2014 | Chaduc et al. |
| 2014/0021303 | A1 | | 1/2014 | Salamat et al. |
| 2016/0229525 | A1 | | 8/2016 | Van De Veire et al. |
| 2017/0350491 | A1 | | 12/2017 | Wilkens |

FOREIGN PATENT DOCUMENTS

| | | |
|---|---|---|
| GB | 826215 | 5/1960 |
| JP | 2015059652 A | 3/2015 |

OTHER PUBLICATIONS

Lindemann R A, et al.: Mars Exploration Rover Mobility Assembly Design, Test and Performance; Systems, Man and Cybernetics, 2005 IEEE International Conference on, IEEE, Piscataway, NJ; vol. 1, Oct. 10, 2005.

Extended EP Search Report for Application No. 17170302.8-1754 dated Nov. 8, 2017.

USPTO Office Action for U.S. Appl. No. 14/886,801 dated Mar. 20, 2018.

* cited by examiner

AUTOMATIC FLIGHT CONTROL ACTUATOR SYSTEMS

TECHNICAL FIELD

The present disclosure generally relates to automatic flight actuator systems, and more particularly relates to a compact automatic flight control actuator system for use with an aircraft.

BACKGROUND

Certain mobile platforms, such as aircraft, employ automatic flight servo systems to assist the pilot in piloting of the aircraft and to augment flight stability during pilot operation. Automatic flight servo systems may also maintain stable flight during non-piloted operation of the aircraft. Generally, these automatic flight servo systems comprise numerous actuators and mechanical couplings in order to meet federal requirements and to perform the requested operations. These actuators and mechanical couplings are connected via linkages and distributed throughout the structure of the aircraft. Due to the numerous actuators, mechanical couplings and linkages, automatic flight servo systems may be too large and heavy for medium and smaller aircraft, especially rotorcraft. Moreover, integrating series actuators into primary flight control linkages introduces challenging mechanical requirements due to vibration resonances and often requires additional analysis to maintain structural stability.

Accordingly, it is desirable to provide an improved automatic flight control actuator system, which is lighter and compact for use on smaller aircraft. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an automatic actuator system. The automatic actuator system includes an input linkage that receives an input and an output linkage adapted to control a flight surface actuator. The automatic actuator system includes a first strain wave gear having a first circular spline coupled to the input linkage and a first flex spline rotatably coupled to the first circular spline. The automatic actuator system includes a second strain wave gear having a second circular spline coupled to the first flex spline. The second strain wave gear includes a second flex spline, and the second flex spline is coupled to the output linkage such that at least a portion of the input from the input linkage is transferred to the output linkage via the first strain wave gear and the second strain wave gear.

Further provided is an automatic actuator system. The automatic actuator system includes an input linkage that receives an input and an output linkage adapted to control a flight surface actuator. The automatic actuator system includes at least one sensor that generates sensor signals based on a movement of the input linkage, and a first actuator system that includes a first motor and a second actuator system that includes a second motor. The automatic actuator system includes a first strain wave gear having a first circular spline coupled to the input linkage and a first flex spline rotatably coupled to the first circular spline. The first strain wave gear includes a first wave generator, and the first wave generator coupled to the first actuator to rotate the first flex spline. The automatic actuator system includes a second strain wave gear having a second circular spline coupled to the first flex spline. The second strain wave gear includes a second flex spline and a second wave generator. The second wave generator is coupled to the second actuator to rotate the second flex spline and the second flex spline is coupled to the output linkage such that at least a portion of the input from the input linkage is transferred to the output linkage via the first strain wave gear and the second strain wave gear. The automatic actuator system includes a control module that receives and processes the sensor signals and outputs one or more control signals to at least one of the first motor and the second motor to rotate at least one of the first wave generator and the second wave generator based on the sensor signals.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
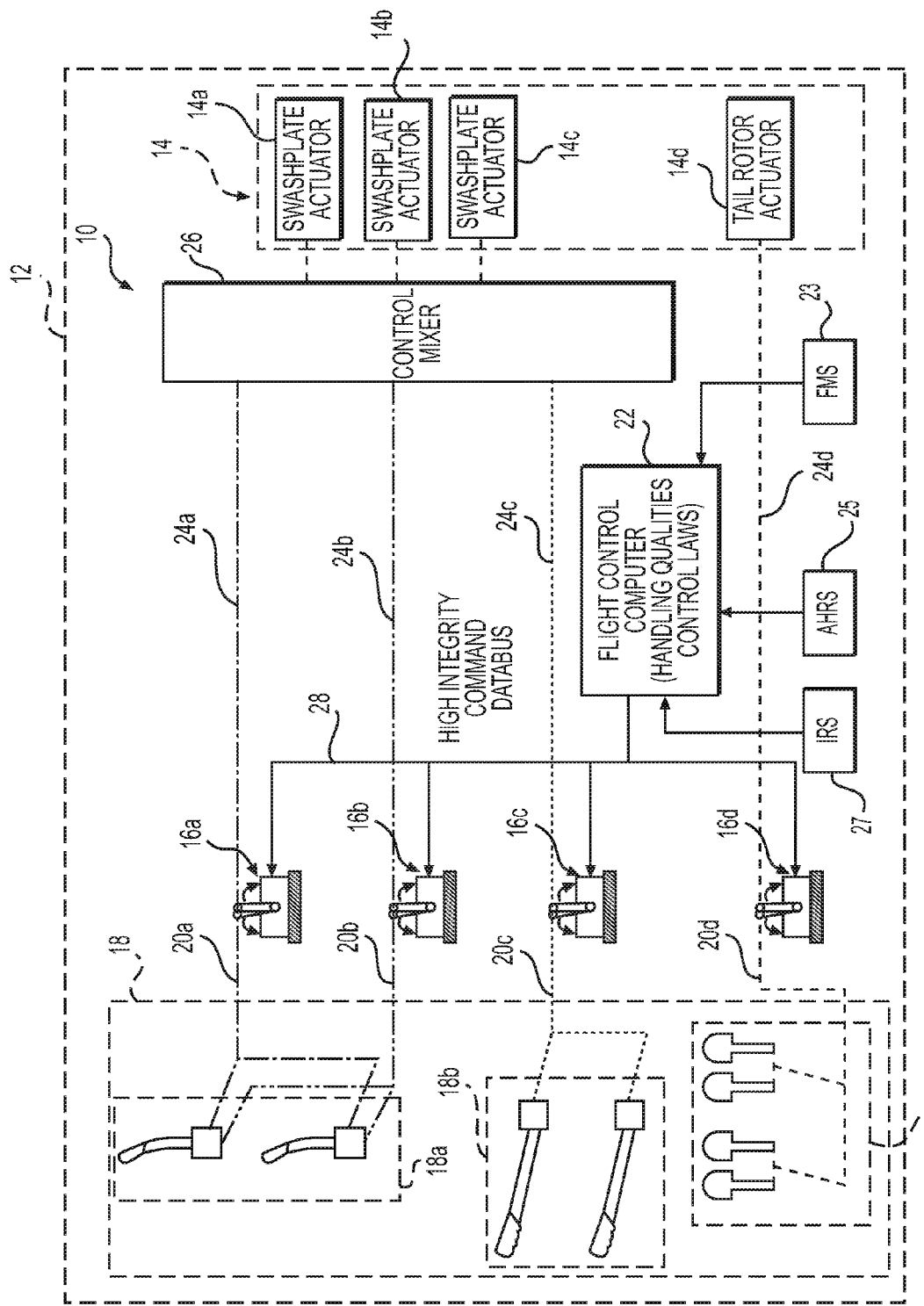
FIG. 1 is a schematic illustration of an automatic flight control actuator system for use with a mobile platform in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. Moreover, while the automatic flight actuator system is described herein as being used onboard a mobile platform, such as an aircraft, for example, an airplane, rotorcraft or spacecraft, it will be understood that the various teachings of the present disclosure may be employed with any suitable mobile platform, such as a bus, motorcycle, heavy equipment vehicles, train, motor vehicle, marine vessel and the like. In addition, the various teachings of the present disclosure can be employed with a stationary platform in which it is desired to transfer input into an output without the use of complex mechanical linkages. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the automatic flight control actuator system described herein is merely one exemplary embodiment of the present disclosure.

With reference to FIG. 1, an automatic flight control actuator system 10 is shown. The automatic flight control actuator system 10 may be referred to as an "Autopilot" system 10. The automatic flight control actuator system 10 can be employed with an aircraft 12 to substantially automatically control the operation or movement of one or more flight surface actuators 14 associated with the aircraft 12. For example, in the example of the aircraft 12 as a rotorcraft, the one or more flight surface actuators 14 comprise one or more swashplate actuators 14a-c, which control the movement of a rotor blade associated with the aircraft 12. The one or more flight surface actuators 14 also include a tail rotor actuator 14d, which controls the movement of a tail rotor of the aircraft 12. It should be understood, however, that the automatic flight control actuator system 10 can control any suitable flight surface associated with the aircraft 12. In the following example, the automatic flight control actuator system 10 includes four automatic actuator systems 16, with each of the four automatic actuator systems 16 providing output to a respective one of the flight surface actuators 14.

In this example, a first automatic actuator system 16a, a second automatic actuator system 16b and a third automatic actuator system 16c each provide output to a control mixer 26, and based on the input from the first automatic actuator system 16a, the second automatic actuator system 16b and the third automatic actuator system 16c, the control mixer 26 generates one or more control signals for the swashplate actuator 14a, the swashplate actuator 14b and the swashplate actuator 14c. A fourth automatic actuator system 16d provides output to the tail rotor actuator 14d. The automatic actuator systems 16 receive input from one or more pilot controls 18. In this example, the one or more pilot controls 18 comprise a pilot joystick 18a, a pilot control stick 18b and pedals 18c. Each of the pilot controls 18 is coupled to respective ones of the automatic actuator systems 16a-d via one or more input couplings and linkages, generally indicated by reference numerals 20a-d. The input couplings and linkages are illustrated herein as dashed lines for clarity. Generally, the input couplings and linkages comprise any mechanical system that enables the transfer of movement between the respective pilot controls 18 and the respective automatic actuator systems 16a-d. Further, the input couplings and linkages 20a-d can comprise an electro-mechanical system, if desired. In one example, the pilot joystick 18a is coupled to and provides input to automatic actuator system 16a and automatic actuator system 16b, based on the movement of the pilot joystick 18a. Thus, in this example, the automatic actuator system 16a is coupled to and provides input to the control mixer 26 to control the pitch of the rotor blade based at least in part on the received input; and the automatic actuator system 16b is coupled to and provides input to the control mixer 26 to control the roll of the rotor blade based at least in part on the received input. The pilot control stick 18b is coupled to and provides input to the automatic actuator system 16c, based on the movement of the pilot control stick 18b. Generally, the automatic actuator system 16c is coupled to and provides input to the control mixer 26 to control the elevation or lift of the rotor blade, based at least in part on the received input. The pedals 18c are coupled to and provide input to the automatic actuator system 16d, based on the movement of the pedals 18c. Generally, the automatic actuator system 16d is coupled to and provides input to the tail rotor actuator 14d to control a pitch of the tail rotor of the aircraft 12, based at least in part on the received input.

Figure 2:
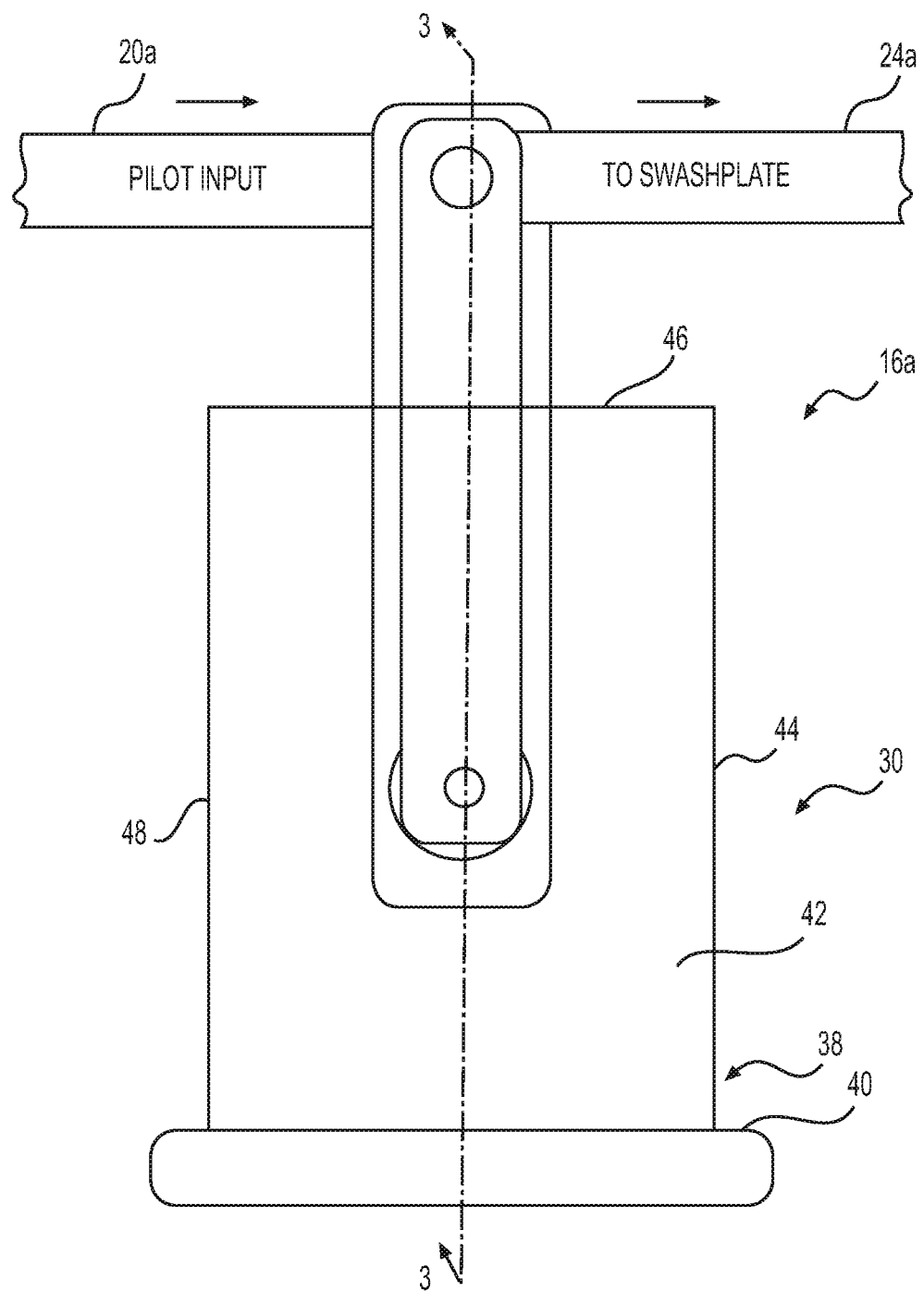
FIG. 2 is a schematic side view of an automatic actuator system for use with the automatic flight control system of FIG. 1.
Figure 3:
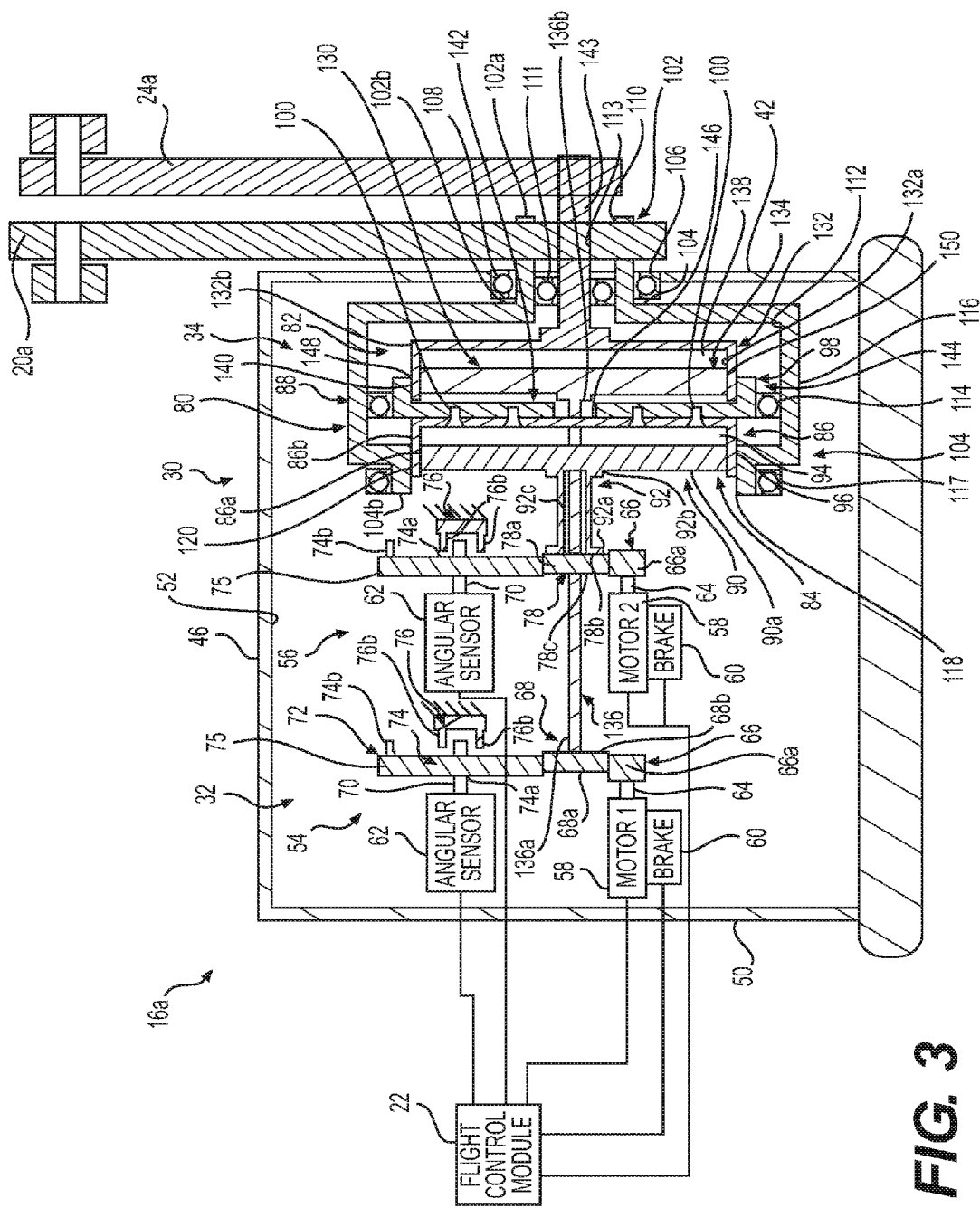
FIG. 3 is a cross-sectional illustration of the automatic actuator system of FIG. 2, taken along line 3-3 of FIG. 2, in accordance with various embodiments.

In one example, each of the automatic actuator systems 16a-d are coupled to the control mixer 26 and the tail rotor actuator 14d to provide input to the swashplate actuators 14a-c and the tail rotor actuator 14d via a flight control module 22. The automatic actuator systems 16a-d are in communication with the flight control module 22 over a suitable architecture 28 that facilitates the transfer of data, power, commands, etc., for example, over a bus, such as a high integrity command databus. The flight control module 22 receives and processes the input received from the pilot controls 18 and generates one or more control signals to the automatic actuator systems 16a-d based thereon, which is output by the automatic actuator systems 16 via one or more output linkages 24a-d. In this example, the output linkages 24a-c of the automatic actuator systems 16a-c are coupled to a control mixer 26, which outputs one or more control signals to the swashplate actuators 14a-14c based on the outputs received from the automatic actuator systems 16a-d. The output linkage 24d is directly coupled to the tail rotor actuator 14*d*. The output linkages 24*a*-*d* comprise any suitable mechanical and/or electromechanical system that transfers the output from the automatic actuator systems 16*a*-*d* to the respective one of the control mixer 26 and the tail rotor actuator 14*d*. With reference to FIGS. 2 and 3, in this example, each of the automatic actuator systems 16*a*-*d* includes a housing 30, a drive system 32 (FIG. 3) and at least one strain wave gear 34 (FIG. 3). As each of the automatic actuator systems 16*a*-*d* are substantially similar, the following description will refer to the first automatic actuator system 16*a*, with the understanding that the following description applies to each of the automatic actuator systems 16*b*-*d*.

The housing 30 encloses and surrounds the drive system 32 and at least a portion of the at least one strain wave gear 34. Generally, with reference to FIG. 2, the output linkage 24*a* and the input linkage 20*a* are disposed substantially outside of the housing 30, however; it will be understood that all or a portion of the output linkage 24*a* and the input linkage 20*a* can be disposed within the housing 30, if desired. The input linkage 20*a* is coupled to the pilot joystick 18*a* to receive input from the pilot. The housing 30 may be composed of any suitable material, and in one example, is composed of a metal or metal alloy. The housing 30 is illustrated herein as substantially rectangular in shape, however, the housing 30 may have any desired shape necessary to enclose the drive system 32 and at least a portion of the at least one strain wave gear 34. The housing 30 includes a cover 38 and a base 40. In one example, the cover 38 is movable relative to the base 40 to enable the assembly of the drive system 32 and at least a portion of the at least one strain wave gear 34 within the housing 30. In one example, the cover 38 is removable from the base 40, via one or more mechanical fasteners (not shown), to enable access to drive system 32 and at least a portion of the at least one strain wave gear 34 disposed within the cover 38. It should be noted, however, that the cover 38 need not be completely removable relative to the base 40, but rather, the cover 38 may be pivotable or hingedly connected to the base 40. It should be noted that the cover 38 and the base 40 illustrated and described herein are merely exemplary, as the housing 30 may have any desired shape, such as a clamshell, etc.

In this example, the cover 38 has a first side 42, a second side 44, a third side 46, a fourth side 48 and a fifth side 50 (FIG. 3), which cooperate to define a cavity 52 (FIG. 3). The cavity 52 receives the drive system 32 and at least a portion of the at least one strain wave gear 34. The cover 38 may include one or more supports, which may be integrally formed within the cavity 52 and/or formed discretely from the cover 38 and coupled within the cavity 52 to support portions of the drive system 32 and at least a portion of the at least one strain wave gear 34 as needed.

The base 40 supports the cover 38. The base 40 is generally solid, and may include one or more coupling features, such as coupling bores, for receipt of one or more mechanical fasteners, to couple the housing 30 to the aircraft 12 (FIG. 1). It should be noted, however, that the housing 30 may be coupled to the aircraft 12 via any suitable technique, and thus, the use of mechanical fasteners is merely exemplary. The base 40 is illustrated herein as having a width greater than a width of the cover 38; however, the base 40 may have a width substantially equal to the width of the cover 38.

The drive system 32 is received within the cavity 52 and is generally contained wholly within the housing 30. The drive system 32 observes the input from the input linkage 20*a* and is communicatively coupled to the flight control module 22 to provide output to the output linkage 24*a*. In one example, the drive system 32 includes a first actuator system 54 and a second actuator system 56. The first actuator system 54 and the second actuator system 56 cooperate to drive the output linkage 24*a* based on one or more control signals received from the flight control module 22. Generally, the first actuator system 54 and the second actuator system 56 each provide about half of the total movement for the output linkage 24*a*. Stated another way, the output of each of the first actuator system 54 and the second actuator system 56 is summed to equal the desired output for the output linkage 24*a* based on the one or more control signals received from the flight control module 22.

The first actuator system 54 includes a motor 58, a brake 60 and a sensor 62. The motor 58 is a high speed motor. The motor 58 includes an output shaft 64. The output shaft 64 is driven by or rotatable by the motor 58 to drive a gear 66. In this example, the motor 58 is communicatively coupled to the flight control module 22 and receives one or more control signals from the flight control module 22 to drive the output shaft 64.

The gear 66 is coupled to the output shaft 64, via any desired technique, such as press-fit, splined coupling, welding, etc. The gear 66 generally comprises a spur gear, and includes a plurality of gear teeth 66*a*. The gear 66 is composed of a metal or a metal alloy, and is formed through casting, forging, selective laser sintering, etc. The plurality of gear teeth 66*a* meshingly engage a first driven gear 68 of the at least one strain wave gear 34. In one example, the first driven gear 68 comprises a spur gear, which includes a plurality of gear teeth 68*a*. The first driven gear 68 is composed of a metal or a metal alloy, and is formed through casting, forging, machining, selective laser sintering, etc. The plurality of gear teeth 68*a* meshingly engages the plurality of gear teeth 66*a* such that the first driven gear 68 is driven by the gear 66. The driving of the first driven gear 68 provides an input torque to the at least one strain wave gear 34. The gear 66 has a diameter, which is smaller than a diameter the first driven gear 68. Generally, the gear 66 is sized and configured such that the gear ratio between the gear 66 and the first driven gear 68 is about 5 to 1.

The brake 60 is coupled to the motor 58. In one example, the brake 60 is coupled to the output shaft 64 of the motor 58 to prevent the rotation of the output shaft 64, thereby braking the motor 58. The brake 60 is communicatively coupled to the flight control module 22 to receive one or more control signals to activate or deactivate the brake 60. Thus, the brake 60 generally comprises an electrically actuated brake. The brake 60 freezes or locks the relative position of the pilot input linkage 20*a* and the swashplate output linkage 24*a* in case of an issue that prevents the motor 58 from properly controlling the relative position. This ensures a fixed linkage from pilot input linkage 20*a* to swashplate output linkage 24*a* to avoid a sloppy link.

In one example, the sensor 62 is an angular sensor, such as a resistive angular sensor, which observes a rotation of a driven shaft 70 and generates sensor signals based thereon. It should be noted, however, that the sensor 62 can comprise any sensor that is capable of observing a position of the output linkage 24*a*, including, but not limited to hall effect sensors, rotary variable differential transformer (RVDT) sensors, potentiometers, etc. In the example of the sensor 62 comprising an angular sensor, the sensor 62 includes the driven shaft 70, which is coupled to a sensor gear 72. The sensor 62 generates sensor signals based on the movement of the driven shaft 70. The sensor 62 is in communication with the flight control module 22, which receives these sensor signals from the sensor 62 and determines a position of the output linkage 24a relative to the input linkage 20a based on these sensor signals.

The sensor gear 72 is coupled to the driven shaft 70 of the sensor 62. The sensor gear 72 is driven by the first driven gear 68. The sensor gear 72 has a diameter, which is larger than a diameter the first driven gear 68. Generally, the sensor gear 72 is sized and configured such that the gear ratio between the sensor gear 72 and the first driven gear 68 is about 6 to 1. The sensor gear 72 is coupled to the driven shaft 70 via any suitable technique, such as press-fit, splined coupling, welding, etc. The sensor gear 72 is generally composed of a metal or metal alloy, and is formed or manufactured through any suitable technique, such as casting, forging, machining, selective laser sintering, etc.

The sensor gear 72 includes a hub 74 and an engagement surface 75. The hub 74 defines a bore 74a, which couples the sensor gear 72 to the driven shaft 70. The hub 74 also includes at least one limit stop 74b. The at least one limit stop 74b extends outwardly from the hub 74 to contact a stop 76. The contact between the at least one limit stop 74b and the stop 76 prevents further advancement of the sensor gear 72, and thus, the relative motion of the output linkage 24a relative to the input linkage 20a as driven by the motor 58. Generally, the stop 76 comprises two posts 76a, which are coupled to the cavity 52 of the housing 30. The engagement surface 75 couples or engages the sensor gear 72 with the first driven gear 68. In one example, the engagement surface 75 comprises a plurality of gear teeth defined about a perimeter or circumference of the sensor gear 72 at a periphery of the sensor gear 72.

As the second actuator system 56 is substantially similar to the first actuator system 54, the same reference numerals will be used to denote the same or substantially similar components. The second actuator system 56 includes the motor 58, the brake 60 and the sensor 62. The motor 58 includes the output shaft 64, which is driven by or rotatable by the motor 58 to drive the gear 66. The motor 58 is communicatively coupled to the flight control module 22 and receives one or more control signals from the flight control module 22 to drive the output shaft 64. The brake 60 is coupled to the output shaft 64 of the motor 58 to prevent the rotation of the output shaft 64, thereby braking the motor 58. The brake 60 is communicatively coupled to the flight control module 22 to receive one or more control signals to activate or deactivate the brake 60.

The gear 66 is coupled to the output shaft 64, and the plurality of gear teeth 66a meshingly engage a second driven gear 78 of the at least one strain wave gear 34. In one example, the second driven gear 78 comprises a spur gear, which includes a plurality of gear teeth 78a. The second driven gear 78 is composed of a metal or a metal alloy, and is formed through casting, forging, machining, selective laser sintering, etc. The plurality of gear teeth 78a meshingly engages the plurality of gear teeth 66a such that the second driven gear 78 is driven by the gear 66. The driving of the second driven gear 78 provides an input torque to the at least one strain wave gear 34. The gear 66 has a diameter, which is smaller than a diameter the second driven gear 78. Generally, the gear 66 is sized and configured such that the gear ratio between the gear 66 and the second driven gear 78 is about 5 to 1.

In one embodiment, the sensor 62 is an angular sensor, such as a resistive angular sensor, which observes a rotation of the driven shaft 70 and generates sensor signals based thereon. It should be noted, however, that the sensor 62 may comprise any sensor that is capable of observing a position of the output linkage 24a-d relative to the input linkage 20a-d, including, but not limited to hall effect sensors, linear variable differential transformer (LVDT) sensors, potentiometers, etc.

In the second actuator system 56, the sensor gear 72 is driven by the second driven gear 78. The sensor 62 includes the driven shaft 70, which is coupled to the sensor gear 72. The sensor 62 generates sensor signals based on the movement of the driven shaft 70. The sensor 62 is in communication with the flight control module 22, which receives these sensor signals from the sensor 62 and determines a position of the output linkage 24a relative to the input linkage 20a based on these sensor signals. The sensor gear 72 has a diameter, which is larger than a diameter the second driven gear 78. Generally, the sensor gear 72 is sized and configured such that the gear ratio between the sensor gear 72 and the second driven gear 78 is about 6 to 1.

The first driven gear 68 and the second driven gear 78 couple the first actuator system 54 and the second actuator system 56, respectively, to the at least one strain wave gear 34. In one example, the at least one strain wave gear 34 includes a first strain wave gear 80 and a second strain wave gear 82. The first driven gear 68 is coupled to the second strain wave gear 82 and the second driven gear 78 is coupled to the first strain wave gear 80. The first strain wave gear 80 and the second strain wave gear 82 operate in series.

The first strain wave gear 80 is coupled to the second driven gear 78, the input linkage 20a and the second strain wave gear 82. The first strain wave gear 80 comprises a first wave generator 84, a first flex spline 86 and a first circular spline 88. The first wave generator 84 is coupled to and rotatable within the first flex spline 86. The first wave generator 84 includes a first wave generator cam 90, and a first wave generator input shaft 92. The first wave generator cam 90 is generally elliptical, and is received within the first flex spline 86. The first wave generator cam 90 is composed of a suitable material, such as a metal or metal alloy, which is cast, machined, forged, etc. The first wave generator input shaft 92 is coupled to the first wave generator cam 90. The first wave generator input shaft 92 moves or rotates based on input received from the motor 58 of the second actuator system 56 via the second driven gear 78. In this regard, in one example, the first wave generator input shaft 92 is fixedly coupled to a hub 78b of the second driven gear 78 at a first end 92a so as to be rotatable with the second driven gear 78. The first wave generator input shaft 92 can be welded to the second driven gear 78, however, one or more mechanical fasteners can be used to fixedly couple the first wave generator input shaft 92 to the second driven gear 78, if desired. Generally, each of the first wave generator input shaft 92 and the second driven gear 78 include throughbores that enable a portion of the second strain wave gear 82 to pass therethrough. Stated another way, each of the first wave generator input shaft 92 and the second driven gear 78 include throughbores 92c, 78c, which enable a portion of the second strain wave gear 82 to rotate relative to the first wave generator input shaft 92 and the second driven gear 78.

The first wave generator input shaft 92 is also fixedly coupled to the first wave generator cam 90 at a second end 92b. In one example, the first wave generator input shaft 92 can be integrally formed with the first wave generator cam 90; however, the first wave generator input shaft 92 can be formed discretely from the first wave generator cam 90 and coupled together via welding, mechanical fasteners, etc. The rotation of the first wave generator input shaft 92 drives the first wave generator cam 90, which in turn drives the first flex spline 86.

The first flex spline 86 is coupled to the second strain wave gear 82, the first wave generator cam 90 and to the first circular spline 88. In one example, the first flex spline 86 comprises a cylindrical thin-walled housing, which includes an inner surface 86a and an outer surface 86b. The first flex spline 86 also defines a substantially circular cavity 94, which is bounded by the inner surface 86a. The inner surface 86a receives the first wave generator cam 90. The first wave generator cam 90 includes an elliptical surface 90a. In certain instances, the elliptical surface 90a is supported by a bearing. In these instances, the bearing has an outer bearing race, which presses against the inner surface 86a of the first flex spline 86 to transfer motion from the first wave generator cam 90 to the first flex spline 86. The outer surface 86b defines an engagement surface 96, which is coupled to or engages the first circular spline 88. In one example, the engagement surface 96 comprises a plurality of gear teeth defined about a portion of the outer surface 86b along a circumference of the outer surface 86b. The engagement surface 96 may define about 198 teeth. As the first flex spline 86 is composed of a metal or metal alloy, such as steel, with a thin-wall thickness, the first flex spline 86 moves or deflects upon the rotation of the elliptical first wave generator 84 within the cavity 94. The deflection of the first flex spline 86 with the movement of the first wave generator 84 causes the engagement surface 96 of the first flex spline 86 to move relative to the first circular spline 88. Generally, the movement of the first flex spline 86 is in an opposite direction (e.g. clockwise or counterclockwise) than the movement of the first wave generator 84.

The first flex spline 86 is coupled to the second strain wave gear 82. The movement of the first flex spline 86 causes a movement of a second circular spline 98 of the second strain wave gear 82. The movement of the second circular spline 98 causes a corresponding movement of the second strain wave gear 82, as will be discussed in greater detail herein. The first flex spline 86 is coupled to the second circular spline 98 via any technique, including, but not limited to, a plurality of mechanical fasteners 100. In this example, the mechanical fasteners 100 can be threadably received into corresponding threaded bores formed through the first flex spline 86 and the second circular spline 98.

The first circular spline 88 is coupled to the input linkage 20a and the first flex spline 86. The first circular spline 88 is generally composed of a metal or metal alloy, and is formed through a suitable technique, such as casting, forging, machining, etc. The first circular spline 88 includes a hub 102 and an extension 104. The hub 102 is received within and extends through an opening 106 defined in the first wall 42 of the housing 30. A bearing 108, coupled to the opening 106, supports the hub 102, and thus, the first circular spline 88, for rotation relative to the housing 30. The bearing 108 comprises any suitable bearing, and in this example, comprises a ball bearing. The input linkage 20a is coupled to a first end 102a of the hub 102, and the extension 104 extends from a second end 102b of the hub 102. The hub 102 also defines a central bore 110 from the first end 102a to the second end 102b to enable a portion of the second strain wave gear 82 to pass therethrough. Thus, the central bore 110 enables the second strain wave gear 82, and thus, the output linkage 24a to rotate relative to the first strain wave gear 80. In this example, the second strain wave gear 82 is supported for rotation within the central bore 110 by a bearing 111. The bearing 111 is coupled to the central bore 110, and comprises any suitable bearing, and in this example, comprises a ball bearing. The input linkage 20a also defines a bore 113, which enables a portion of the second strain wave gear 82 to pass therethrough and enables the second strain wave gear 82 to rotate relative to the input linkage 20a.

The extension 104 extends inwardly into the cavity 52 from the second end 102b. The extension 104 includes a first end 104a and a second end 104b, and a diameter of the first end 104a is generally less than a diameter of the second end 104b. A spline cavity 112 is defined between the first end 104a and the second end 104b. The spline cavity 112 receives a portion of the second strain wave gear 82, the first wave generator cam 90 and the first flex spline 86.

The first end 104a is coupled to the second end 102b of the hub 102. The first end 104a has the diameter, which is greater than a diameter of the hub 102. The first end 104a includes a bore 104c in communication with the central bore 110 of the hub 102 to enable the portion of the second strain wave gear 82 to pass therethrough and rotate relative to the first strain wave gear 80. An annular sidewall 116 extends between the first end 104a and the second end 104b, and cooperates with the first end 104a and the second end 104b to define the spline cavity 112. A bearing 114 is coupled to the annular sidewall 116 to support the rotation of the second circular spline 98 within the spline cavity 112. The bearing 114 comprises any suitable bearing, and in this example, comprises a ball bearing.

The second end 104b defines an annular or ring-shaped opening 118 and an engagement surface 120. The second end 104b is supported for rotation within the cavity 52 by a bearing 117. The bearing 117 comprises any suitable bearing, and in this example, comprises a ball bearing. The bearing 117 is disposed on a surface of the second end 104b that is substantially opposite the ring-shaped opening 118. The ring-shaped opening 118 receives the first flex spline 86 such that the engagement surface 120 engages with the engagement surface 96 of the first flex spline 86. The engagement surface 120 is defined about an inner circumference of the ring-shaped opening 118, and in one example, comprises a plurality of gear teeth. The engagement surface 120 may define about 200 teeth, which may result in a gear reduction ratio of about 100 to 1. The plurality of gear teeth of the engagement surface 120 meshingly engage the plurality of gear teeth of the engagement surface 96 to enable the first circular spline 88 to drive and/or be driven by the first flex spline 86. Generally, the first flex spline 86 has slightly fewer gear teeth than the first circular spline 88, and this ratio defines a gear reduction ratio. For each complete rotation of the first wave generator 84, the first flex spline 86 will rotate by the difference in number of teeth, which is two in this example. Thus, in this example, the output motion is $(2/200)*360=3.6°$ for one revolution of the first wave generator 84 or a gear reduction of $1/100$.

The second strain wave gear 82 is coupled to the first driven gear 68, the output linkage 24a and the first strain wave gear 80. The second strain wave gear 82 comprises a second wave generator 130, a second flex spline 132 and the second circular spline 98. The second wave generator 130 is coupled to and rotatable within the second flex spline 132. The second wave generator 130 includes a second wave generator cam 134, and a second wave generator input shaft 136. The second wave generator cam 134 is generally elliptical, and is received within the second flex spline 132. The second wave generator cam 134 is composed of a suitable material, such as a metal or metal alloy, which is cast, machined, forged, etc. In certain instances, the second wave generator cam 134 is supported by a bearing. In these instances, the bearing has an outer bearing race, which presses against an inner surface 132a of the second flex spline 132 to transfer motion from the second wave generator cam 134 to the second flex spline 132. The second wave generator input shaft 136 is coupled to the second wave generator input cam 134. The second wave generator input shaft 136 moves or rotates based on input received from the motor 58 of the first actuator system 54 via the first driven gear 68. In this regard, in one example, the second wave generator input shaft 136 is fixedly coupled to a hub 68b of the first driven gear 68 at a first end 136a so as to be rotatable with the first driven gear 68, and thus driven by the motor 58 of the first actuator system 54. The second wave generator input shaft 136 can be welded to the first driven gear 68, however, one or more mechanical fasteners can be used to fixedly couple the second wave generator input shaft 136 to the first driven gear 68, if desired.

The second wave generator input shaft 136 is also fixedly coupled to the second wave generator cam 134 at a second end 136b. In one example, the second wave generator input shaft 136 can be integrally formed with the second wave generator cam 134; however, the second wave generator input shaft 136 can be formed discretely from the second wave generator cam 134 and coupled together via welding, mechanical fasteners, etc. The rotation of the second wave generator input shaft 136 drives the second wave generator cam 134, which in turn drives the second flex spline 132.

The second flex spline 132 is coupled to the second wave generator cam 134 and to the output linkage 24a. In one example, the second flex spline 132 comprises a cylindrical thin-walled housing, which includes the inner surface 132a and an outer surface 132b. The second flex spline 132 also defines a substantially circular cavity 138, which is bounded by the inner surface 132a. The inner surface 132a receives the second wave generator cam 134. The outer surface 132b defines an engagement surface 140, which is coupled to or engages the second circular spline 98. In one example, the engagement surface 140 comprises a plurality of gear teeth defined about a portion of the outer surface 132b along a circumference of the outer surface 132b. The engagement surface 140 may define about 198 teeth. As the second flex spline 132 is composed of a metal or metal alloy, such as steel, with a thin-wall thickness, the second flex spline 132 moves or deflects upon the rotation of the elliptical second wave generator 130 within the cavity 138. The deflection of the second flex spline 132 with the movement of the second wave generator 130 causes the engagement surface 140 of the second flex spline 132 to move relative to the second circular spline 98. Generally, the movement of the second flex spline 132 is in an opposite direction (e.g. clockwise or counterclockwise) than the movement of the second wave generator 130.

The second flex spline 132 is coupled to the output linkage 24a via a shaft 143. The movement of the second flex spline 132 causes the movement of the output linkage 24a. Generally, the second flex spline 132 receives input or torque from the motor 58 of the first actuator system 54 via the first driven gear 68 and the second wave generator 130, and also receives input from the motor 58 of the second actuator system 56 via the fixed coupling between the first flex spline 86 and the second circular spline 98. These two inputs from the first actuator system 54 and the second actuator system 56 cooperate to provide the output for the output linkage 24a based on the pilot input received via the input linkage 20a and processed by the flight control module 22.

The second circular spline 98 is coupled to the first flex spline 86 and the second flex spline 132. The second circular spline 98 is generally composed of a metal or metal alloy, and is formed through a suitable technique, such as casting, forging, machining, etc. The second circular spline 98 includes a second hub 142 and a second extension 144. The second hub 142 includes a plurality of threaded bores for receipt of the mechanical fasteners 100 to fixedly couple the second circular spline 98 to the first flex spline 86. The second hub 142 also defines a central bore 146, which enables the second wave generator input shaft 136 to pass through the second circular spline 98 and to rotate relative to the second circular spline 98.

The second extension 144 extends from the second hub 142. The second extension 144 is coupled to the bearing 114 to support the second circular spline 98 for rotation within the spline cavity 112. The second extension 144 defines a second annular or ring-shaped opening 148 and an engagement surface 150. The second ring-shaped opening 148 receives the second flex spline 132 such that the engagement surface 150 engages with the engagement surface 140 of the second flex spline 132. The engagement surface 150 is defined about an inner circumference of the second ring-shaped opening 148, and in one example, comprises a plurality of gear teeth. The engagement surface 150 may define about 200 teeth, which may result in a gear reduction ratio of about 100 to 1. The plurality of gear teeth of the engagement surface 150 meshingly engage the plurality of gear teeth of the engagement surface 140 to enable the second flex spline 132 to drive and/or be driven by the second circular spline 98.

The automatic flight control actuator system 10 can be assembled in various ways. In one example, each of the automatic actuator systems 16a-d are assembled, and coupled to the respective one of the input linkages 20a-d and output linkages 24a-d. In order to assemble each of the automatic actuator systems 16a-d, the motors 58 and the brakes 60 can be coupled to the cavity 52 of the housing 30. With the gears 66 coupled to the output shafts 64 of the motors 58, the sensors 62 are coupled to the cavity 52 of the housing 30, such that the limit stops 74b are each aligned with the posts 76a of the respective stops 76. The first circular spline 88 is coupled to the housing 30, such that the hub 102 extends through the opening 106 and the second end 104b is received within the bearing 117. The second flex spline 132 is positioned through the central bore 110, and the second wave generator 130 and the second circular spline 98 are positioned within the spline cavity 112 and coupled to the second flex spline 132. The second circular spline 98 is coupled within the spline cavity 112 so as to be coupled to the bearing 114 and supported for rotation within the spline cavity 112. Generally, the first wave generator 84 and the second driven gear 78 are positioned about the second wave generator 130 prior to the coupling of the first driven gear 68 to the second wave generator input shaft 136. With the first driven gear 68 coupled to the second wave generator 130, the first driven gear 68 is coupled to the gear 66 and the sensor gear 72 of the first actuator system 54. The first wave generator 84 is coupled to the first flex spline 86, and the second driven gear 78 is coupled to the sensor gear 72 and the gear 66 of the motor 58 of the second actuator system 56.

With the automatic flight control actuator system 10 assembled, upon receipt of an input from the pilot via the pilot controls 18 to the input linkages 20a-d, the input from the pilot moves or rotates the input linkage 20a-d, causing a rotation of the first circular spline 88. The rotation of the first circular spline 88 causes a rotation of the first flex spline 86 via the meshing engagement of the engagement surface 120 of the first circular spline 88 and the engagement surface 96 of the first flex spline 86. The rotation of the first flex spline 86 causes a rotation of the second circular spline 98. The rotation of the second circular spline 98 causes a rotation of the second flex spline 132 via the meshing engagement between the engagement surface 150 of the second circular spline 98 and the engagement surface 140 of the second flex spline 132. The rotation of the second flex spline 132 causes a movement or rotation of the respective output linkage 24*a-d*. The flight control module 22 can add or subtract from the motion of the second flex spline 132 by outputting one or more control signals to the motors 58 of the first actuator system 54 and/or second actuator system 56.

Figure 4:
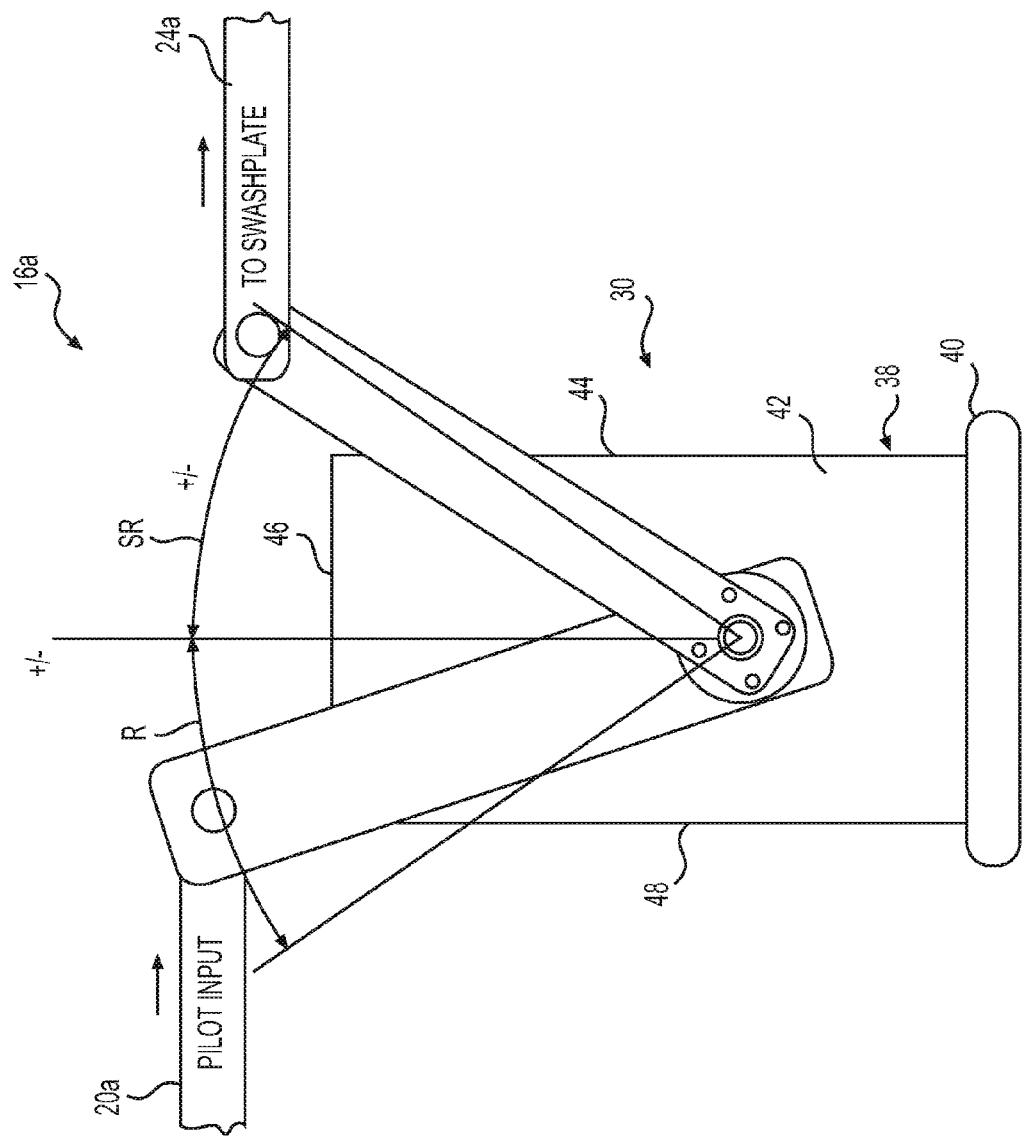
FIG. 4 is a schematic side view of the automatic actuator system of FIG. 2, which illustrates a range of movement for the automatic actuator system.

In one example, with reference to FIG. 4, the input linkage 20*a-d* has a range of motion R between about positive or negative 40 degrees, and the output linkage 24*a-d* has a range of motion SR between about positive or negative 40 degrees relative to the motion of the input linkage 20*a-d* for a total range of motion of about positive or negative 80 degrees due to the gear ratio of the first strain wave gear 80 and the second strain wave gear 82. In addition, the input linkage 20*a-d* may include one or more stops, which may limit the range of motion of the output linkage 24*a-d* relative to the input linkage 20*a-d* by contacting a portion of the output linkage 24*a-d*. In one example, the overall gear ratio of the first strain wave gear 80 and second strain wave gear 82 is about 100 to 1. Based on the gear ratio of the first strain wave gear 80 and the second strain wave gear 82, the motion of the flight surface actuators 14*a-d* via the output linkages 24*a-d* may be calculated as:

$$\delta_{SP} = \delta_{PI}\left[1 + \frac{1}{GR_{1st}} + \frac{1}{GR_{2nd}}\right] - \frac{\delta_{WG1st}}{GR_{1st}} - \frac{\delta_{WG2nd}}{GR_{2nd}} \quad (1)$$

Wherein $\delta_{SP}$ is the motion of the flight surface actuators 14*a-d* via the respective output linkages 24*a-d*; $\delta_{PI}$ is the pilot input motion received via the respective input linkages 20*a-d*; $GR_{1st}$ is the gear reduction of the first strain wave gear 80; $GR_{2nd}$ is the gear reduction of the second strain wave gear 82; $\delta_{WG1st}$ is the motion of the first wave generator 84 received from the motor 58 of the first actuator system 54; and $\delta_{WG2nd}$ is the motion of the second wave generator 130 received from the motor 58 of the second actuator system 56.

With reference back to FIGS. 1 and 3, upon receipt of input from the respective pilot controls 18, the respective input linkage 20*a-d* moves. The movement of the respective input linkage 20*a-d* causes the movement or rotation of the first circular spline 88. The rotation of the first circular spline 88 causes a movement or rotation of the first flex spline 86, and thus, a movement or rotation of the second circular spline 98. The rotation of the second circular spline 98 causes a rotation of the second flex spline 132, which causes a movement or rotation of the respective output linkage 24*a-d*. The flight control module 22 can add or subtract from the motion of the second flex spline 132 by outputting one or more control signals to the motors 58 of the first actuator system 54 and/or second actuator system 56. In this regard, the second actuator system 56 is meshingly engaged with the second driven gear 78 via the gear 66, and thus, the second actuator system 56 controls the resulting motion of the second driven gear 78 based on the one or more control signals received from the flight control module 22. The movement of the gear 66 via the motor 58 causes a rotation of the sensor gear 72. The sensor 62 of the second actuator system 56 observes this movement and generates sensor signals based thereon, which are transmitted to the flight control module 22.

As the first actuator system 54 is meshingly engaged with the first driven gear 68 via the gear 66, the first actuator system 54 controls the resulting motion of the first driven gear 68 based on the one or more control signals received from the flight control module 22. The movement of the gear 66 via the motor 58 causes a rotation of the sensor gear 72. The sensor 62 of the first actuator system 54 observes this movement and generates sensor signals based thereon, which are transmitted to the flight control module 22.

With reference to FIG. 1, the flight control module 22 receives as input flight control commands from the pilot controls 18 or other Flight Management Systems (FMS) 23 associated with the aircraft 12. The FMS 23 comprises flight planning and navigation algorithms that are used to produce flight control commands. The flight control module 22 compares the received commands with a current motion of the aircraft 12 as measured by Attitude/Heading Reference Systems (AHRS) 25 and/or Inertial Reference Systems (IRS) 27 associated with the aircraft 12. The AHRS 25 and the IRS 27 generally include one or more sensors that observe a motion of the aircraft 12, and generate sensor signals based thereon such as aircraft attitude (pitch & roll), aircraft attitude rates (pitch, roll, yaw) and accelerations relative to the aircraft axis (normal, lateral, & longitudinal). Based on the received commands and sensor signals, the flight control module 22 computes flight control actuator position commands. The flight control actuator position commands or control signals are converted in a Servo Control Loop into commands for the motors 58. The Servo Control Loop can be embedded in the flight control module 22 or integrated into the automatic actuator system 16, itself. Stated another way, the automatic actuator system 16 can include one or more modules that receive the flight control actuator position commands or control signals and generate control loop commands based thereon. The Servo Control Loop also monitors the motion of the motor 58 via the respective sensor 62 in order to ensure the flight control actuator position commands or control signals are satisfied or performed.

As will be discussed below, the flight control module 22 receives and processes the sensor signals from the sensors 62. Based on the sensor signals, the flight control module 22 outputs one or more control signals to the motors 58 of the first actuator system 54 and/or the second actuator system 56. The motor 58 of the first actuator system 54 and/or the motor 58 of the second actuator system 56 rotates the respective output shaft 64, which drives the gear 66 and in turn, drives the first driven gear 68 and/or the second driven gear 78. By driving the first driven gear 68, the motor 58 of the first actuator system 54 rotates the second wave generator input shaft 136, which rotates the second flex spline 132, and thus, the output linkage 24*a-d*. By driving the second driven gear 78, the motor 58 of the second actuator system 56 rotates the first wave generator input shaft 92, which in turn, rotates the first flex spline 86 and the second circular spline 98. The rotation of the second circular spline 98 also rotates the second flex spline 132, and thus, the output linkage 24*a-d*. The control of the output linkage 24*a-d* by the first actuator system 54 and the second actuator system 56 via the flight control module 22 adds or subtracts from the input received from the pilot controls 18 to ensure the stability of the aircraft 12. Thus, the drive system 32 cooperates with the flight control module 22 to augment or adjust the input received by the input linkages 20*a-d* to maintain stable and safe flight of the aircraft 12. Moreover, the drive system 32 cooperates with the flight control module 22 to enable the control of the output linkage 24a-d without requiring pilot input to the input linkages 20a-d, providing for an autopilot of the aircraft 12.

In various embodiments, the flight control module 22 outputs one or more control signals to the motor 58 of the first actuator system 54 to drive the second strain wave gear 82 based on sensor signals received from the sensor 62 of the first actuator system 54 and/or the sensor 62 of the second actuator system 56, and based on the systems and methods of the present disclosure. The flight control module 22 outputs one or more control signals to the motor 58 of the second actuator system 56 to drive the first strain wave gear 80 based on the sensor signals received from the sensor 62 of the first actuator system 54 and/or the sensor 62 of the second actuator system 56, and based on the systems and methods of the present disclosure. The flight control module 22 also outputs one or more control signals to the brake 60 of the first actuator system 54 and/or second actuator system 56 based on the sensor signals received from the sensor 62 of the first actuator system 54 and/or the sensor 62 of the second actuator system 56, and based on the systems and methods of the present disclosure.

Figure 5:
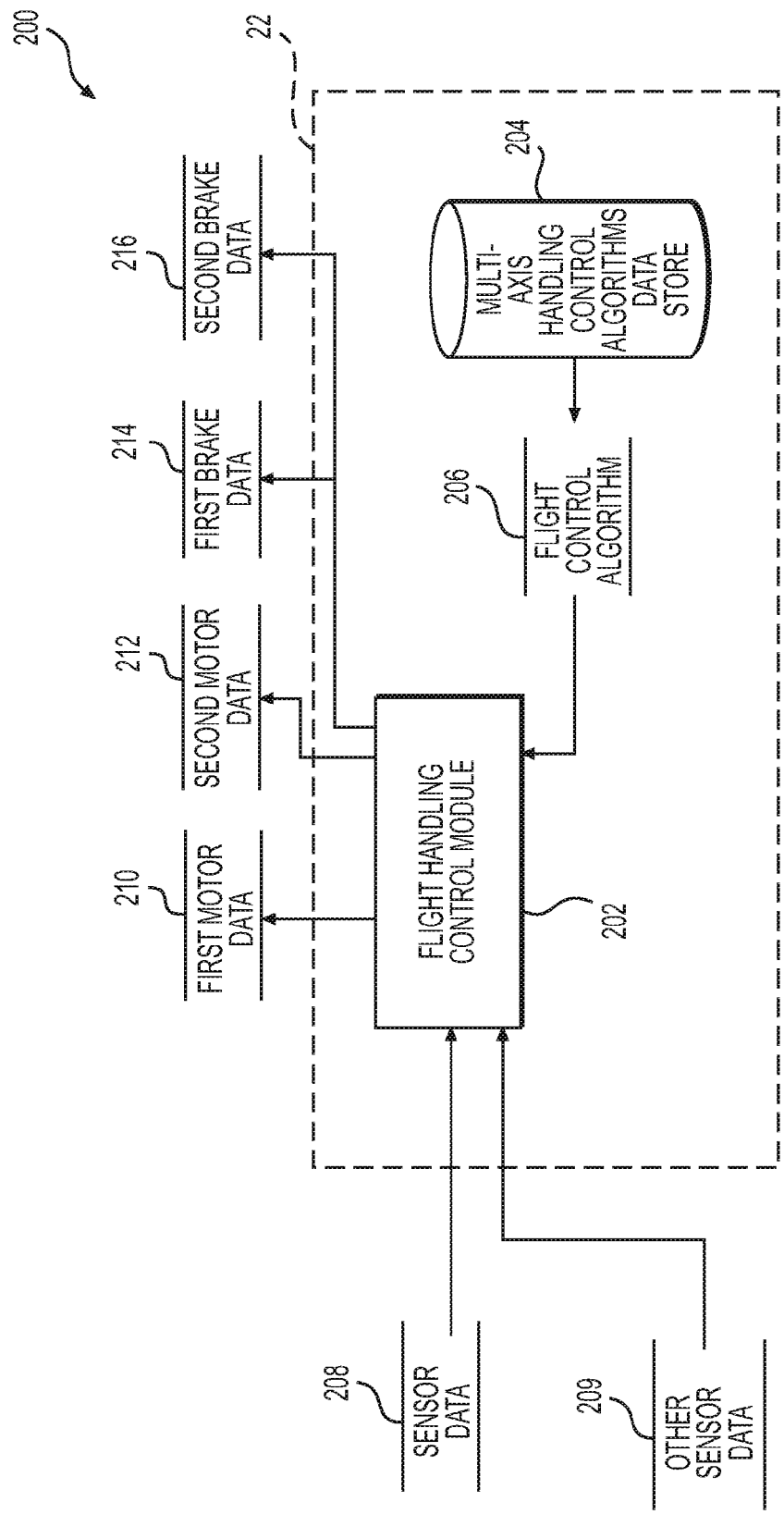
FIG. 5 is a dataflow diagram illustrating a control system of the automatic actuator system of FIG. 2 in accordance with various embodiments.

Referring now to FIG. 5, and with continued reference to FIGS. 1 and 3, a dataflow diagram illustrates various embodiments of a control system 200 for the automatic actuator system 16a-d, which may be embedded within the flight control module 22. Various embodiments of the control system 200 according to the present disclosure can include any number of sub-modules embedded within the flight control module 22. As can be appreciated, the sub-modules shown in FIG. 5 can be combined and/or further partitioned to similarly control the motor 58 of the first actuator system 54, the brake 60 of the first actuator system 54, the motor 58 of the second actuator system 56 and the brake 60 of the second actuator system 56. Inputs to the control system 200 may be received from the sensor 62 of the first actuator system 54 (FIG. 3), received from the sensor 62 of the second actuator system 56 (FIG. 3), received from other control modules (not shown) associated with the aircraft 12, the FMS 23, the AHRS 25, the IRS 27 and/or determined/modeled by other sub-modules (not shown) within the flight control module 22. In various embodiments, the flight control module 22 includes a flight handling control module 202 and a multi-axis handling control algorithm data store 204.

The multi-axis handling control algorithm data store 204 stores one or more multi-axis handling control algorithms that provide values for the motors 58 of the first actuator system 54 and the second actuator system 56 based on the sensor signals from the sensors 62. Stated another way, the multi-axis handling control algorithm data store 204 stores various flight control algorithms that are processed to determine a necessary movement of the motors 58 of the first actuator system 54 and the second actuator system 56 to achieve a desired output for the flight surface actuators 14a-d based on the input received from the pilot controls 18 to the input linkages 20a-d as observed by the sensors 62. Alternatively, the multi-axis handling control algorithm data store 204 can store a look-up table, populated based on experimental or calibration data, which provides the values for the motors 58 based on the sensor signals from the sensors 62.

The flight handling control module 202 receives as input sensor data 208. The sensor data 208 comprises the sensor signals from the sensors 62 of the first actuator system 54 and the second actuator system 56. The flight handling control module 202 may also receive as input other sensor data 209, such as a current yaw, a current pitch, a current roll, a pitch and roll attitude and pitch, roll and yaw body rates of the aircraft 12, for example, which can be received from other sensors onboard the aircraft 12 and/or received from other modules associated with the aircraft 12, such as the AHRS 25 and the IRS 27. The flight handling control module 202 processes the received sensor data, including the sensor data 208 and 209, and retrieves the flight control algorithm 206 based on the received sensor data. The flight handling control module 202 processes the flight control algorithm 206 for the received sensor data, including the sensor data 208, and determines one or more control signals for the motor 58 of the first actuator system 54 and the motor 58 of the second actuator system 56. The one or more control signals comprise commands for each of the motors 58 to drive the first strain wave gear 80 and the second strain wave gear 82 to subtract from or add to the input provided via the input linkages 20a-20d to ensure stable flight of the aircraft 12. The flight handling control module 202 outputs the determined one or more control signals for the motor 58 of the first actuator system 54 as first motor data 210. The flight handling control module 202 outputs the determined one or more control signals for the motor 58 of the second actuator system 56 as second motor data 212.

The flight handling control module 202 also processes the sensor data 208 to determine a status of the motor 58 of the first actuator system 54 and a status of the motor 58 of the second actuator system 56. For example, the flight handling control module 202 processes the sensor data 208 to determine whether the motors 58 are operating properly, such that the output of the respective motor 58 is consistent with the output commanded by the one or more control signals to the respective motor 58. If the flight handling control module 202 determines that the motor 58 of the first actuator system 54 is not operating properly, the flight control module 22 outputs first brake data 214. The first brake data 214 comprises one or more control signals to the brake 60 of the first actuator system 54 to apply the brake 60 to the motor 58 to prevent the further rotation of the output shaft 64 associated with the motor 58 of the first actuator system 54. If the flight handling control module 202 determines that the motor 58 of the second actuator system 56 is not operating properly, the flight handling control module 202 outputs second brake data 216. The second brake data 216 comprises one or more control signals to the brake 60 of the second actuator system 56 to apply the brake 60 to the motor 58 to prevent the further rotation of the output shaft 64 associated with the motor 58 of the second actuator system 56.

Figure 6:
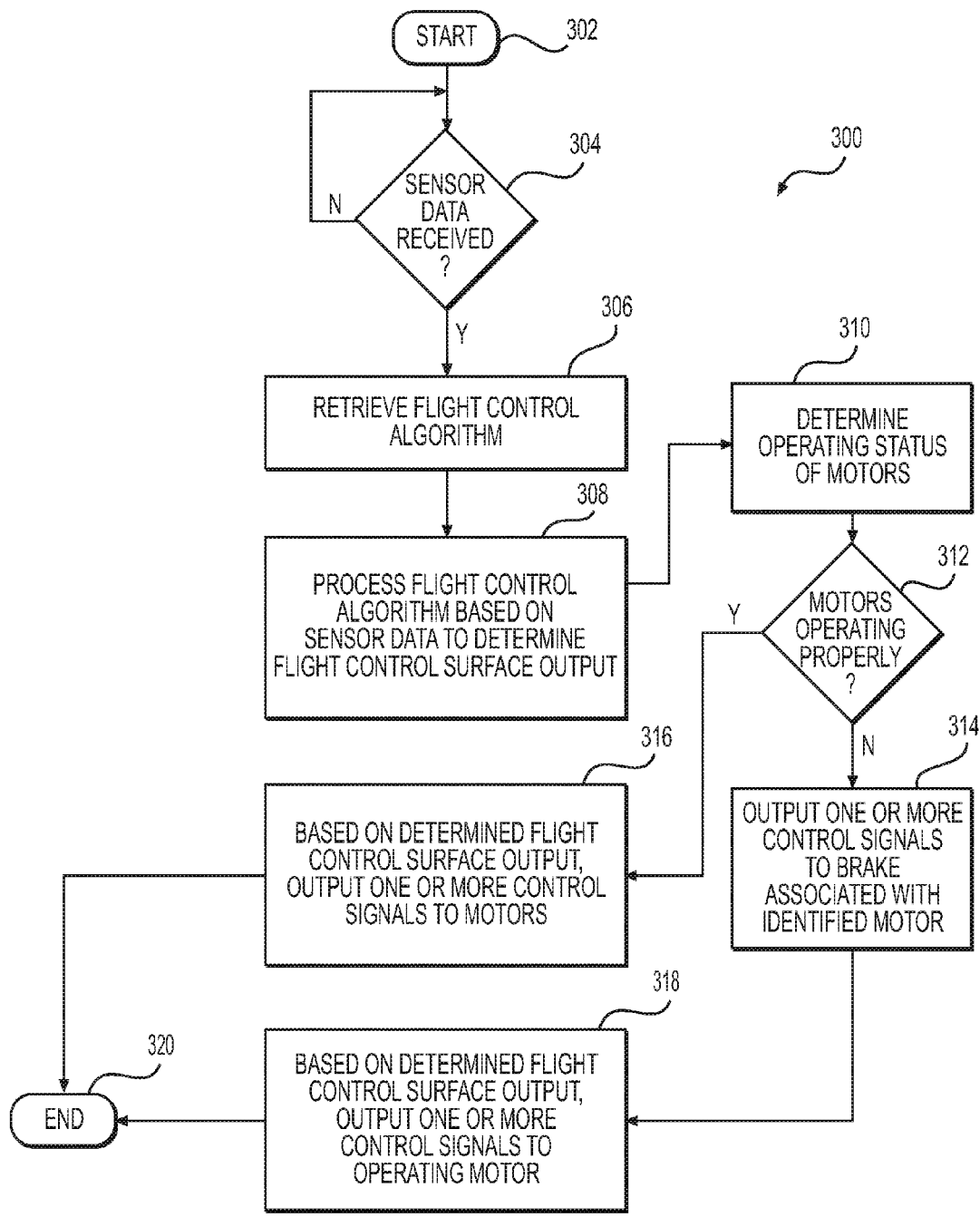
FIG. 6 is a flowchart illustrating a control method of the automatic actuator system of FIG. 2 in accordance with various embodiments.

Referring now to FIG. 6, and with continued reference to FIGS. 1-5, a flowchart illustrates a control method 300 that can be performed by the flight control module 22 of FIGS. 1-5 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure.

In various embodiments, the method can be scheduled to run based on predetermined events, and/or can run based on the receipt of sensor signals from the sensors 62 of the first actuator system 54 and the second actuator system 56.

In one example, the method begins at 302. At 304, the method determines whether sensor data 208 has been received, which indicates that input has been received via the input linkages 20a-d. If sensor data 208 is received, the method proceeds to 306. Otherwise, the method loops.

At 306, the method retrieves the flight control algorithm 206 from the multi-axis handling control algorithm data store 204 based on the sensor data 208 and other sensor data 209. At 308, the method processes the flight control algorithm 206 based on the sensor data 208 and other sensor data 209 to determine the output for the flight surface actuators 14a-d. At 310, the method also processes the sensor data 208 to determine the operating status of the motors 58. At 312, the method determines whether the motors 58 are operating properly. If one of the motors 58 is determined to not be operating properly, the method proceeds to 314. Otherwise, the method proceeds to 316.

At 314, the method outputs one or more control signals to the brake 60 (e.g. first brake data 214 or second brake data 216) to apply the brake 60 to the respective motor 58 that has been determined to not be operating properly. At 318, the method, based on the determined output for the flight surface actuators 14a-d, outputs one or more control signals to the operating motor 58 to drive the corresponding one of the first strain wave gear 80 or second strain wave gear 82 to add or subtract from the input received to the input linkage 20a-d. The method ends at 320.

At 316, the method, based on the determined output for the flight surface actuators 14a-d, outputs one or more control signals to the motors 58 (e.g. first motor data 210 and second motor data 212) to drive the first strain wave gear 80 and the second strain wave gear 82. The method ends at 320.

Figure 7:
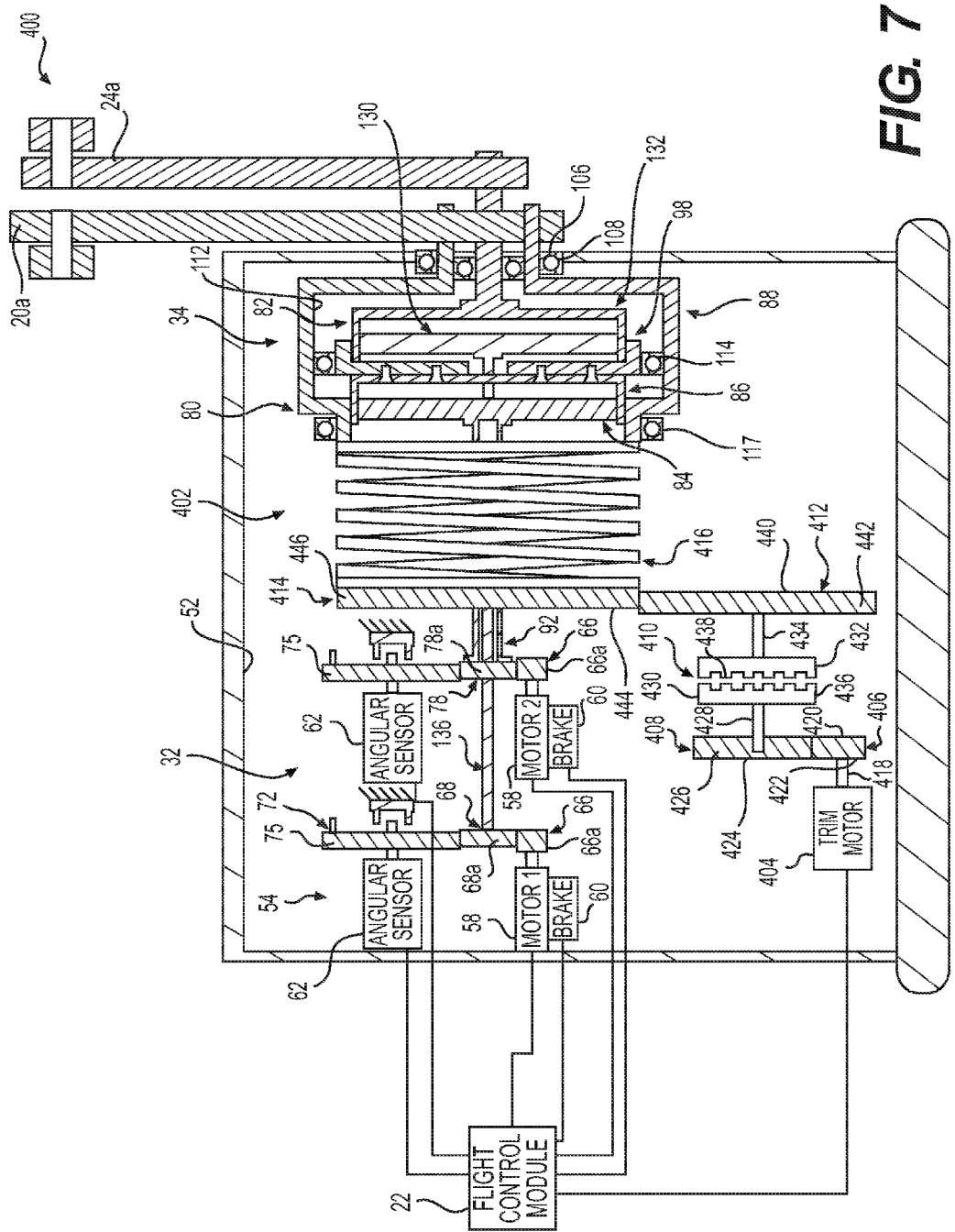
FIG. 7 is a cross-sectional illustration of another automatic actuator system for use with the automatic flight control actuator system of FIG. 1, taken along line 3-3 of FIG. 2, in accordance with various embodiments.

It will be appreciated that one or more of the automatic actuator systems 16a-d can be configured in a different manner to achieve the desired control of the flight surface actuators 14a-d and/or to respond differently upon receipt of input from the pilot controls 18. In this regard, with reference to FIG. 7, an automatic actuator system 400 is shown. As the automatic actuator system 400 is similar to the automatic actuator systems 16a-d, the same reference numerals will be used to denote the same or substantially similar components.

The automatic actuator system 400 is coupled to the respective one of the control mixer 26 or the tail rotor actuator 14d via a respective flight surface actuator 14a-d. In this example, the automatic actuator system 400 will be described as receiving input from the pilot joystick 18a via input linkage 20a, and generating output for the swashplate actuator 14a via the output linkage 24a. It will be understood, however, that the automatic actuator system 400 can be employed with any of the flight surface actuators 14b-d. The automatic actuator system 400 is also in communication with the flight control module 22 over a suitable architecture that facilitates the transfer of data, power, commands, etc., for example, over a bus, such as a high integrity command databus. The automatic actuator system 400 includes the housing 30, the drive system 32, the at least one strain wave gear 34, which includes the first strain wave gear 80 and the second strain wave gear 82, and a trim input system 402.

The trim input system 402 is received within the cavity 52 of the cover 38, and is generally contained wholly within the housing 30. The trim input system 402 maintains the position of the pilot controls 18. In one example, the trim input system 402 includes a trim motor 404, a first gear 406, a second gear 408, a clutch 410, a third gear 412, a fourth gear 414 and a feel biasing member or spring 416. During manual flight, the trim input system 402 provides a force from the spring 416, which the pilot pushes against when moving a control, such as the pilot controls 18. The trim motor 404 through the clutch 410 acts as a ground for the spring 416 so it exerts a force against pilot control motion. The pilot has the option of controlling the clutch 410 and the trim motor 404 in manual flight to allow adjustment of the neutral location of the spring 416. Pushing a "Force Trim Release" button on the control disengages the clutch 410 and allows the pilot to reposition the pilot controls 18 with no force or compression of the spring 416. Releasing the button reengages the clutch 410 and once again the spring 416 exerts force against pilot motion but from a new neutral position where the button was released. In addition, the pilot can push "trim beep" switches which will drive the trim motor 404 and reposition the spring 416 while the clutch 410 remains engaged to allow the pilot to incrementally adjust the spring 416 neutral position. If the pilot engages the automatic actuator system 400, the pilot is normally not exerting force on the pilot control 18 and the spring 416 will hold the pilot controls 18 in a fixed position.

The trim motor 404 is coupled to the first gear 406 via an output shaft 418. Generally, the trim motor 404 is a low bandwidth actuator, which has a high stroke. The trim motor 404 is responsive to one or more control signals or an electric current to move or rotate the output shaft 418. The one or more control signals can be received from the flight control module 22, or can be received from another module associated with the aircraft 12. Generally, the trim motor 404 is coupled in parallel with the pilot controls 18 and has full range authority. The rotation of the output shaft 418 drives the first gear 406.

The first gear 406 is coupled to the output shaft 418 via any suitable technique, such as press-fit, welding, spline coupling, etc. The first gear 406 is generally composed of a metal or metal alloy, and may be formed or manufactured through any suitable technique, such as casting, machining, hot isostatic pressing, etc. The first gear 406 may have a diameter, which is smaller than a diameter of the second gear 408. The first gear 406 includes a hub 420 and a first plurality of gear teeth 422. The hub 420 defines a bore, which couples the first gear 406 to the output shaft 418. The first plurality of gear teeth 422 couple or meshingly engage the first gear 406 with the second gear 408. In one example, the first plurality of gear teeth 422 is defined about a perimeter or circumference of the first gear 406 at a periphery of the first gear 406. The gear ratio of the trim motor 404 to the output shaft 418 may be about 10 to 1 or more. The first gear 406 and the second gear 408 may each comprise a worm gear or similar to allow the use of a small multi-turn trim motor 404. By using a worm gear, the first gear 406 and the second gear 408 each have a high resistance to being backdriven such that the trim motor 404 will act as a stop or ground position when not being driven.

The second gear 408 is driven by the first gear 406. The first gear 406 is generally composed of a metal or metal alloy, and may be formed or manufactured through any suitable technique, such as casting, machining, hot isostatic pressing, etc. The second gear 408 includes a hub 424 and a second plurality of gear teeth 426. The hub 424 defines a bore, which couples the second gear 408 to a driving shaft 428 of the clutch 410. The second gear 408 is coupled to the driving shaft 428 via any suitable technique, such as press-fit, welding, etc. The second plurality of gear teeth 426 couple or meshingly engage the second gear 408 with the first gear 406. In one example, the second plurality of gear teeth 426 is defined about a perimeter or circumference of the second gear 408 at a periphery of the second gear 408.

The clutch 410 is coupled to the second gear 408 and the third gear 412. In one example, the clutch 410 includes the driving shaft 428, a first clutch plate 430, a second clutch plate 432 and a driven shaft 434. It should be noted that the clutch 410 described and illustrated herein is merely exemplary, as the clutch 410 may comprise any suitable clutch, such as a magnetic clutch, for engaging and disengaging the driving shaft 428 and the driven shaft 434. Generally, the clutch 410 is responsive to one or more control signals from a control module of the aircraft 12, such as the flight control module 22, to engage and couple the driving shaft 428 with the driven shaft 434 or to disengage and decouple the driving shaft 428 from the driven shaft 434 to enable adjustment of the spring 416, as discussed above. For example, the clutch 410 may receive one or more control signals to engage the first clutch plate 430 with the second clutch plate 432 based on the control module receiving a signal to set a position of the pilot controls 18. The driving shaft 428 is coupled to the second gear 408 so as to be driven by the trim motor 404 via the first gear 406 and the second gear 408. The driving shaft 428 is also coupled to the first clutch plate 430.

The first clutch plate 430 is composed of a suitable metal or metal alloy, and defines a first friction surface 436. The first friction surface 436 may comprise a ceramic or compound organic resin, which is capable of frictionally engaging a second friction surface 438 of the second clutch plate 432 to couple the driving shaft 428 with the driven shaft 434. The second clutch plate 432 is composed of a suitable metal or metal alloy, and defines the second friction surface 438. The second friction surface 438 cooperates with the first friction surface 436 to couple the first clutch plate 430 with the second clutch plate 432.

The driven shaft 434 is coupled to the second clutch plate 432 and is coupled to the third gear 412. When the clutch 410 is engaged, the torque from the output shaft 418 of the trim motor 404 is transferred through the first gear 406, the second gear 408 and the driving shaft 428 to the driven shaft 434, which in turn rotates the third gear 412. The rotation of the third gear 412 drives the fourth gear 414.

The third gear 412 is coupled to the driven shaft 434, and is coupled to the fourth gear 414. The third gear 412 is coupled to the driven shaft 434 via any suitable technique, such as press-fit, welding, etc. The third gear 412 is generally composed of a metal or metal alloy, and may be formed or manufactured through any suitable technique, such as casting, machining, hot isostatic pressing, etc. The third gear 412 may have a diameter, which is greater than the diameter of the second gear 408. The third gear 412 includes a hub 440 and a third plurality of gear teeth 442. The hub 440 defines a bore, which couples the third gear 412 to the driven shaft 434. The third plurality of gear teeth 442 couple or meshingly engage the third gear 412 with the fourth gear 414. In one example, the third plurality of gear teeth 442 is defined about a perimeter or circumference of the third gear 412 at a periphery of the third gear 412.

The fourth gear 414 is coupled to or meshingly engages with the third gear 412, and is coupled to the spring 416. The fourth gear 414 is coupled to the spring 416 via any suitable technique, such as welding, mechanical fasteners, etc. The fourth gear 414 is generally composed of a metal or metal alloy, and may be formed or manufactured through any suitable technique, such as casting, machining, hot isostatic pressing, etc. The fourth gear 414 may have a diameter, which is greater than the diameter of the third gear 412. The fourth gear 414 includes a hub 444 and a fourth plurality of gear teeth 446. The hub 444 defines a bore, which is sized to enable the fourth gear 414 to be positioned about the first wave generator input shaft 92 of the first strain wave gear 80. Generally, the hub 444 is sized such that the fourth gear 414 rotates relative to the first strain wave gear 80. In this example, when the hub 444 rotates, the hub 444 winds up the spring 416 which then exerts a rotational torque on the first strain wave gear 80. The fourth plurality of gear teeth 446 couple or meshingly engage the fourth gear 414 with the third gear 412. In one example, the fourth plurality of gear teeth 446 is defined about a perimeter or circumference of the fourth gear 414 at a periphery of the fourth gear 414.

The spring 416 is disposed about the first wave generator input shaft 92 of the first strain wave gear 80 and the second wave generator input shaft 136 of the second strain wave gear 82. In one example, the first wave generator input shaft 92 of the first strain wave gear 80 and the second wave generator input shaft 136 can have a greater length, if necessary, to accommodate the spring 416. The spring 416 is coupled to the fourth gear 414 such that a movement or rotation of the fourth gear 414 results in a corresponding movement of the spring 416. The spring 416 is also coupled to the first circular spline 88 such that the movement of the first circular spline 88, based on input received from the input linkage 20a-d, is counteracted by a force of the spring 416 so that the spring 416 resists the pilot input to provide the pilot with the feel of a resistance during manual flight. Moreover, the movement of the spring 416 by the fourth gear 414 can maintain a position of the input linkages 20a-d. The spring 416 comprises any suitable biasing member, such as a coil spring, etc.

As the automatic actuator system 400 can be assembled in a substantially similar manner as the automatic actuator systems 16a-d of FIGS. 1-6, the assembly of the automatic actuator system 400 will not be discussed in great detail herein. Briefly, however, the spring 416 and the fourth gear 414 can be positioned about the first wave generator input shaft 92 of the first strain wave gear 80 and the second wave generator input shaft 136 of the second strain wave gear 82 prior to coupling the first driven gear 68 and the second driven gear 78 to the respective gears 66. With the trim motor 404 coupled within the cavity 52, the clutch 410 can be inserted into the cavity 52 with the second gear 408 and the third gear 412 coupled to the clutch 410. The third gear 412 is coupled to the fourth gear 414. The first gear 406 is coupled to the trim motor 404 and the second gear 408 is coupled to the first gear 406.

As the operation of the automatic actuator system 400 is similar to the operation of the automatic actuator systems 16a-d discussed with regard to FIGS. 1-6, the operation of the automatic actuator system 400 will not be discussed in great detail herein. Briefly, however, the trim motor 404 can adjust a position of the pilot controls 18 (FIG. 1) based on the receipt of one or more control signals from the control module, such as the flight control module 22, to rotate the output shaft 418. The rotation of the output shaft 418 causes the first gear 406 to drive the second gear 408. With the clutch 410 engaged, the driving of the second gear 408 results in the rotation of the driven shaft 434, which in turn drives the third gear 412 and the fourth gear 414. The rotation of the fourth gear 414 exerts motion to the spring 416 which in turn exerts motion to the first circular spline 88, and thus, the input linkage 20a-d and pilot controls 18. With minimal external loads the spring 416 will not deflect and the motion will be transferred directly. Depending on external loads induced by the pilot via the pilot controls 18, for example, the spring 416 may compress or extend to allow output motion independent of the trim motor 404. This motion will induce a spring force proportional to the deflection resulting in a force sensed by the pilot.

It will be appreciated that one or more of the automatic actuator systems 16a-d can be configured in a different manner to achieve the desired control of the flight surface actuators 14a-d and/or to respond differently upon receipt of input from the pilot controls 18. In this regard, with reference to FIG. 8, an automatic actuator system 500 is shown. As the automatic actuator system 500 is similar to the automatic actuator systems 16a-d of FIGS. 1-6, the same reference numerals will be used to denote the same or substantially similar components.

The automatic actuator system 500 is coupled to the respective one of the control mixer 26 or the tail rotor actuator 14d via a respective flight surface actuators 14a-d. In this example, the automatic actuator system 500 will be described as receiving input from the pilot joystick 18a via input linkage 20a, and generating output for the swashplate actuator 14a via the output linkage 24a. It will be understood, however, that the automatic actuator system 500 can be employed with any of the flight surface actuators 14b-d. The automatic actuator system 500 is also in communication with a flight control module 502 over a suitable architecture that facilitates the transfer of data, power, commands, etc., for example, over a bus, such as a high integrity command databus. The automatic actuator system 500 includes the housing 30, a drive system 504 and at least one strain wave gear 506.

The drive system 504 is received within the cavity 52 and is generally contained wholly within the housing 30. The drive system 504 observes the input from the input linkage 20a and is communicatively coupled to the flight control module 502 to provide output to the output linkage 24a. In one example, the drive system 504 includes a first actuator system 508 and a second actuator system 510. The first actuator system 508 and the second actuator system 510 cooperate to drive the output linkage 24a based on one or more control signals received from the flight control module 502. Generally, the first actuator system 508 and the second actuator system 510 each provide about half of the total movement for the output linkage 24a. Stated another way, the output of each of the first actuator system 508 and the second actuator system 510 is summed to equal the desired output for the output linkage 24a based on the one or more control signals received from the flight control module 502.

The first actuator system 508 includes the motor 58 and the brake 60. The motor 58 includes the output shaft 64, which is rotatable to drive the gear 66. The motor 58 is communicatively coupled to the flight control module 502 and receives one or more control signals from the flight control module 502 to drive the output shaft 64. The gear 66 is coupled to and meshingly engages with the first driven gear 68. The driving of the first driven gear 68 provides an input torque to the at least one strain wave gear 506. The brake 60 is coupled to the motor 58, and is communicatively coupled to the flight control module 502 to receive one or more control signals to activate or deactivate the brake 60.

As the second actuator system 510 is substantially similar to the first actuator system 508, the same reference numerals will be used to denote the same or substantially similar components. The second actuator system 510 includes the motor 58 and the brake 60. The motor 58 includes the output shaft 64, which is driven by or rotatable by the motor 58 to drive the gear 66. The motor 58 is communicatively coupled to the flight control module 502 and receives one or more control signals from the flight control module 502 to drive the output shaft 64. The gear 66 is coupled to and meshingly engages the second driven gear 78 of the at least one strain wave gear 506. The driving of the second driven gear 78 provides an input torque to the at least one strain wave gear 506. The brake 60 is coupled to the motor 58, and is communicatively coupled to the flight control module 502 to receive one or more control signals to activate or deactivate the brake 60.

The first driven gear 68 and the second driven gear 78 couple the first actuator system 508 and the second actuator system 510, respectively, to the at least one strain wave gear 506. In one example, the at least one strain wave gear 506 includes a first strain wave gear 512 and a second strain wave gear 514. The first driven gear 68 is coupled to the second strain wave gear 514 and the second driven gear 78 is coupled to the first strain wave gear 512. The first strain wave gear 512 and the second strain wave gear 514 operate in series.

The first strain wave gear 512 is coupled to the second driven gear 78, the input linkage 20a and the second strain wave gear 514. The first strain wave gear 512 comprises the first wave generator 84, the first flex spline 86 and a first circular spline 516. The first wave generator 84 is coupled to and rotatable within the first flex spline 86, and includes the first wave generator cam 90 and the first wave generator input shaft 92. The first wave generator input shaft 92 moves or rotates based on input received from the motor 58 of the second actuator system 510 via the second driven gear 78. The rotation of the first wave generator input shaft 92 drives the first wave generator cam 90, which in turn drives the first flex spline 86. The first flex spline 86 is coupled to the second strain wave gear 514, the first wave generator cam 90 and to the first circular spline 516. The movement of the first flex spline 86 causes a movement of the second circular spline 98 of the second strain wave gear 514.

The first circular spline 516 is coupled to the input linkage 20a and the first flex spline 86. The first circular spline 516 is generally composed of a metal or metal alloy, and is formed through a suitable technique, such as casting, forging, machining, etc. The first circular spline 516 includes the hub 102 and an extension 518. The extension 518 extends inwardly into the cavity 52 from the second end 102b. The extension 518 includes a first end 518a and a second end 518b, and a diameter of the first end 518a is generally less than a diameter of the second end 518b. A spline cavity 520 is defined between the first end 518a and the second end 518b. The spline cavity 520 receives a portion of the second strain wave gear 514, the first wave generator cam 90 and the first flex spline 86.

The first end 518a is coupled to the second end 102b of the hub 102. The first end 518a has the diameter, which is greater than a diameter of the hub 102. The first end 518a includes a bore 518c in communication with the central bore 110 of the hub 102 to enable the portion of the second strain wave gear 514 to pass through and rotate relative to the first strain wave gear 512. An annular sidewall 522 extends between the first end 518a and the second end 518b and cooperates with the first end 518a and the second end 518b to define the spline cavity 520. The bearing 114 is coupled to the annular sidewall 522 to support the rotation of the second strain wave gear 514 within the spline cavity 520.

The second end 518b defines the annular or ring-shaped opening 118, the engagement surface 120 and a projection 524. The ring-shaped opening 118 receives the first flex spline 86 such that the engagement surface 120 engages with the engagement surface 96 of the first flex spline 86. The projection 524 extends outwardly from the second end 518b, and is generally spaced apart from the engagement surface 120 and the ring-shaped opening 118. The projection 524 defines a bore 526, through which the first wave generator input shaft 92 and the second wave generator input shaft 136 pass. The projection 524 is generally sized to receive a gear 528. The gear 528 couples the first strain wave gear 512 to a first sensor system 530.

The gear 528 is coupled to or meshingly engages with the first sensor system 530, and is coupled to an exterior circumference of the projection 524. The gear 528 is coupled to the projection 524 via any suitable technique, such as welding, mechanical fasteners, splined coupling, etc. The gear 528 is generally composed of a metal or metal alloy, and may be formed or manufactured through any suitable technique, such as casting, machining, hot isostatic pressing, etc. The gear 528 includes a hub 532 and a plurality of gear teeth 534. The hub 532 defines a bore, which is sized to enable the gear 528 to be positioned about the projection 524. The plurality of gear teeth 534 couple or meshingly engage the gear 528 with the first sensor system 530. In one example, the plurality of gear teeth 534 is defined about a perimeter or circumference of the gear 528 at a periphery of the gear 528.

The first sensor system 530 is coupled to the gear 528. In one example, the first sensor system 530 includes a plurality of first sensor gears 536 and a plurality of sensors 538, each associated with a respective one of the plurality of first sensor gears 536. The first sensor system 530 observes a movement of the gear 528 caused by the rotation of the first circular spline 516 from the receipt of input at the input linkage 20a, and generates sensor signals based thereon. The first sensor gears 536 are driven by the gear 528. The first sensor gears 536 each have a diameter, which is smaller than a diameter the gear 528. Generally, the first sensor gears 536 are sized and configured such that the gear ratio between each of the first sensor gears 536 and the gear 528 is about 4 to 1. In one example, each of the plurality of sensors 538 turn about four degrees for every one degree of motion of the first circular spline 516. The first sensor gears 536 are generally composed of a metal or metal alloy, and are formed or manufactured through any suitable technique, such as casting, forging, machining, selective laser sintering, etc.

The first sensor gears 536 each include a hub 540 and a plurality of gear teeth 542. The plurality of gear teeth 542 of each of the first sensor gears 536 meshingly engage with the plurality of gear teeth 534 of the gear 528 such that the movement of the gear 528 drives each of the plurality of first sensor gears 536.

Each of the plurality of sensors 538 are coupled to a respective one of the plurality of first sensor gears 536. In one example, the plurality of sensors 538 each comprise a position sensor, for example, an angular sensor, such as a resistive angular sensor, which observes a rotation of a driven shaft 544 and generates sensor signals based thereon. It should be noted, however, that each of the plurality of sensors 538 can comprise any sensor that is capable of observing a position of the input linkage 20a, including, but not limited to Hall Effect sensors, rotary variable differential transformer (RVDT) sensors, potentiometers, etc. In the example of the plurality of sensors 538 each comprising an angular sensor, each of the plurality of sensors 538 include the driven shaft 544, which is coupled to a respective first sensor gear 536. Thus, the respective first sensor gear 536 of each of the plurality of sensors 538 meshingly engages with the driven shaft 544. The driven shaft 544 is coupled to the first sensor gears 536 via any technique, including, but not limited to, welding, press-fit, splined coupling, etc. Each of the plurality of sensors 538 generate sensor signals based on the movement of the driven shaft 544. The plurality of sensors 538 are in communication with the flight control module 502, which receives these sensor signals from the plurality of sensors 538 and determines a position of the input linkage 20a based on these sensor signals. Thus, each of the plurality of sensors 538 independently observes and measures a rotation of the input linkage 20a.

The second strain wave gear 514 is coupled to the first driven gear 68, the output linkage 24a and the first strain wave gear 512. The second strain wave gear 514 comprises the second wave generator 130, a second flex spline 550 and the second circular spline 98. The second wave generator 130 is coupled to and rotatable within the second flex spline 132. The second wave generator 130 includes the second wave generator cam 134, and the second wave generator input shaft 136. The second wave generator input shaft 136 moves or rotates based on input received from the motor 58 of the first actuator system 508 via the first driven gear 68. The rotation of the second wave generator input shaft 136 drives the second wave generator cam 134, which in turn drives the second flex spline 132.

The second flex spline 550 is coupled to the second wave generator cam 134 and to the output linkage 24a. In one example, the second flex spline 550 comprises a cylindrical thin-walled housing, which includes the inner surface 132a and the outer surface 132b. The second flex spline 132 also defines the substantially circular cavity 138, which is bounded by the inner surface 132a. The inner surface 132a receives the second wave generator cam 134. The outer surface 132b defines an engagement surface 140, which is coupled to or engages the second circular spline 98. In one example, the engagement surface 140 comprises a plurality of gear teeth defined about a portion of the outer surface 132b along a circumference of the outer surface 132b. The engagement surface 140 may define about 200 teeth. As the second flex spline 550 is composed of a metal or metal alloy, such as steel, with a thin-wall thickness, the second flex spline 550 moves or deflects upon the rotation of the elliptical second wave generator 130 within the cavity 138. The deflection of the second flex spline 132 with the movement of the second wave generator 130 causes the engagement surface 140 of the second flex spline 132 to move relative to the second circular spline 98.

The second flex spline 550 is coupled to the output linkage 24a via a shaft 552. In one example, the shaft 552 includes a gear 554. The gear 554 couples a second sensor system 556 to the shaft 552, such that the second sensor system 556 observes a movement of the shaft 552. The gear 554 is coupled to or meshingly engages with the second sensor system 556, and is coupled to an exterior circumference of the shaft 552. The gear 554 is coupled to the shaft 552 via any suitable technique, such as welding, mechanical fasteners, splined coupling, etc. It should be noted that the shaft 552 can also be integrally formed with the gear 554, if desired. Generally, the gear 554 is fixedly coupled to the shaft 552, such that the gear 554 rotates with the shaft 552. The gear 554 is generally composed of a metal or metal alloy, and may be formed or manufactured through any suitable technique, such as casting, machining, hot isostatic pressing, etc. The gear 554 includes a hub 555 and a plurality of gear teeth 558. The hub 555 defines a bore, which is sized to enable the gear 554 to be positioned about the shaft 552. The plurality of gear teeth 558 couple or meshingly engage the gear 554 with the second sensor system 556. In one example, the plurality of gear teeth 558 is defined about a perimeter or circumference of the gear 554 at a periphery of the gear 554.

The second sensor system 556 is coupled to the gear 554. In one example, the second sensor system 556 includes a plurality of second sensor gears 560 and a plurality of sensors 562, each associated with a respective one of the plurality of second sensor gears 560. The second sensor system 556 observes a movement of the shaft 552 caused by the rotation of the second flex spline 550, and generates sensor signals based thereon. Each of the second sensor gears 560 is driven by the gear 554. The second sensor gears 560 have a diameter, which is smaller than a diameter the gear 554. Generally, the second sensor gear 560 is sized and configured such that the gear ratio between the second sensor gear 560 and the gear 554 is about 4 to 1. In one example, each of the plurality of sensors 562 turn about four degrees for every one degree of motion of the shaft 552. The second sensor gears 560 are generally composed of a metal or metal alloy, and are formed or manufactured through any suitable technique, such as casting, forging, machining, selective laser sintering, etc.

Each of the second sensor gears 560 include a hub 565 and a plurality of gear teeth 566. The plurality of gear teeth 566 of each of the second sensor gears 560 meshingly engage with the plurality of gear teeth 558 of the gear 554 such that the movement of the gear 554 drives each of the plurality of second sensor gears 560.

The plurality of sensors 562 are each coupled to a respective one of the plurality of second sensor gears 560. In one example, the plurality of sensors 562 each comprise a position sensor, for example, an angular sensor, such as a resistive angular sensor, which observes a rotation of a driven shaft 564 and generates sensor signals based thereon. It should be noted, however, that each of the plurality of sensors 562 can comprise any sensor that is capable of observing a position of the output linkage 24a, including, but not limited to Hall Effect sensors, rotary variable differential transformer (RVDT) sensors, potentiometers, etc. In the example of the plurality of sensors 562 each comprising an angular sensor, each of the plurality of sensors 562 include the driven shaft 564, which is coupled to the respective one of the plurality of second sensor gears 560. The driven shaft 564 is coupled to the respective one of the plurality of second sensor gears 560 via any technique, including, but not limited to, welding, press-fit, splined coupling, etc. Each of the plurality of sensors 562 generate sensor signals based on the movement of the driven shaft 564. The plurality of sensors 562 are in communication with the flight control module 502, which receives these sensor signals from the plurality of sensors 562 and determines a position of the output linkage 24a based on these sensor signals. Thus, each of the plurality of sensors 562 independently observes and measures a rotation of the output linkage 24a.

The movement of the second flex spline 550 causes the movement of the output linkage 24a. Generally, the second flex spline 550 receives input or torque from the motor 58 of the first actuator system 508 via the first driven gear 68 and the second wave generator 130, and also receives input from the motor 58 of the second actuator system 510 via the fixed coupling between the first circular spline 88 and the second circular spline 98. These two inputs from the first actuator system 508 and the second actuator system 510 cooperate to provide the output for the output linkage 24a based on the pilot input received via the input linkage 20a and processed by the flight control module 502.

The second circular spline 98 is coupled to the first flex spline 86 and the second flex spline 550. The second circular spline 98 includes the second hub 142 and the second extension 144. The second extension 144 defines the second annular or ring-shaped opening 148 and the engagement surface 150. The second ring-shaped opening 148 receives the second flex spline 550 such that the engagement surface 150 engages with the engagement surface 140 of the second flex spline 132. The engagement surface 150 is defined about an inner circumference of the second ring-shaped opening 148, and comprises a plurality of gear teeth. The plurality of gear teeth of the engagement surface 150 meshingly engage the plurality of gear teeth of the engagement surface 140 to enable the second flex spline 550 to drive and/or be driven by the second circular spline 98.

As will be discussed below, the flight control module 502 receives and processes the sensor signals from the plurality of sensors 538 and the plurality of sensors 562. Based on the sensor signals, the flight control module 502 outputs one or more control signals to the motors 58 of the first actuator system 508 and/or the second actuator system 510. The motor 58 of the first actuator system 508 and/or the motor 58 of the second actuator system 510 rotates the respective output shaft 64, which drives the gear 66 and in turn, drives the first driven gear 68 and/or the second driven gear 78. By driving the first driven gear 68, the motor 58 of the first actuator system 508 rotates the second wave generator input shaft 136, which rotates the second flex spline 550, and thus, the output linkage 24a-d. By driving the second driven gear 78, the motor 58 of the second actuator system 510 rotates the first wave generator input shaft 92, which in turn, rotates the first flex spline 86 and the second circular spline 98. The rotation of the second circular spline 98 also rotates the second flex spline 550, and thus, the output linkage 24a-d. The control of the output linkage 24a-d by the first actuator system 508 and the second actuator system 510 via the flight control module 502 adds or subtracts from the input received from the pilot to ensure the stability of the aircraft 12. Thus, the drive system 504 cooperates with the flight control module 502 to augment or adjust the input received by the input linkages 20a-d to maintain stable and safe flight of the aircraft 12. Moreover, the drive system 504 cooperates with the flight control module 502 to enable the control of the output linkage 24a-d without requiring pilot input to the input linkages 20a-d, providing for an autopilot of the aircraft 12.

In various embodiments, the flight control module 502 outputs one or more control signals to the motor 58 of the first actuator system 508 to drive the second strain wave gear 514 based on sensor signals received from the plurality of sensors 538 and the plurality of sensors 562, and based on the systems and methods of the present disclosure. The flight control module 502 outputs one or more control signals to the motor 58 of the second actuator system 510 to drive the first strain wave gear 512 based on the sensor signals received from the plurality of sensors 538 and the plurality of sensors 562, and based on the systems and methods of the present disclosure. The flight control module 502 also outputs one or more control signals to the brake 60 of the first actuator system 508 and/or second actuator system 510 based on the sensor signals received from the plurality of sensors 538 and the plurality of sensors 562, and based on the systems and methods of the present disclosure.

Figure 8:
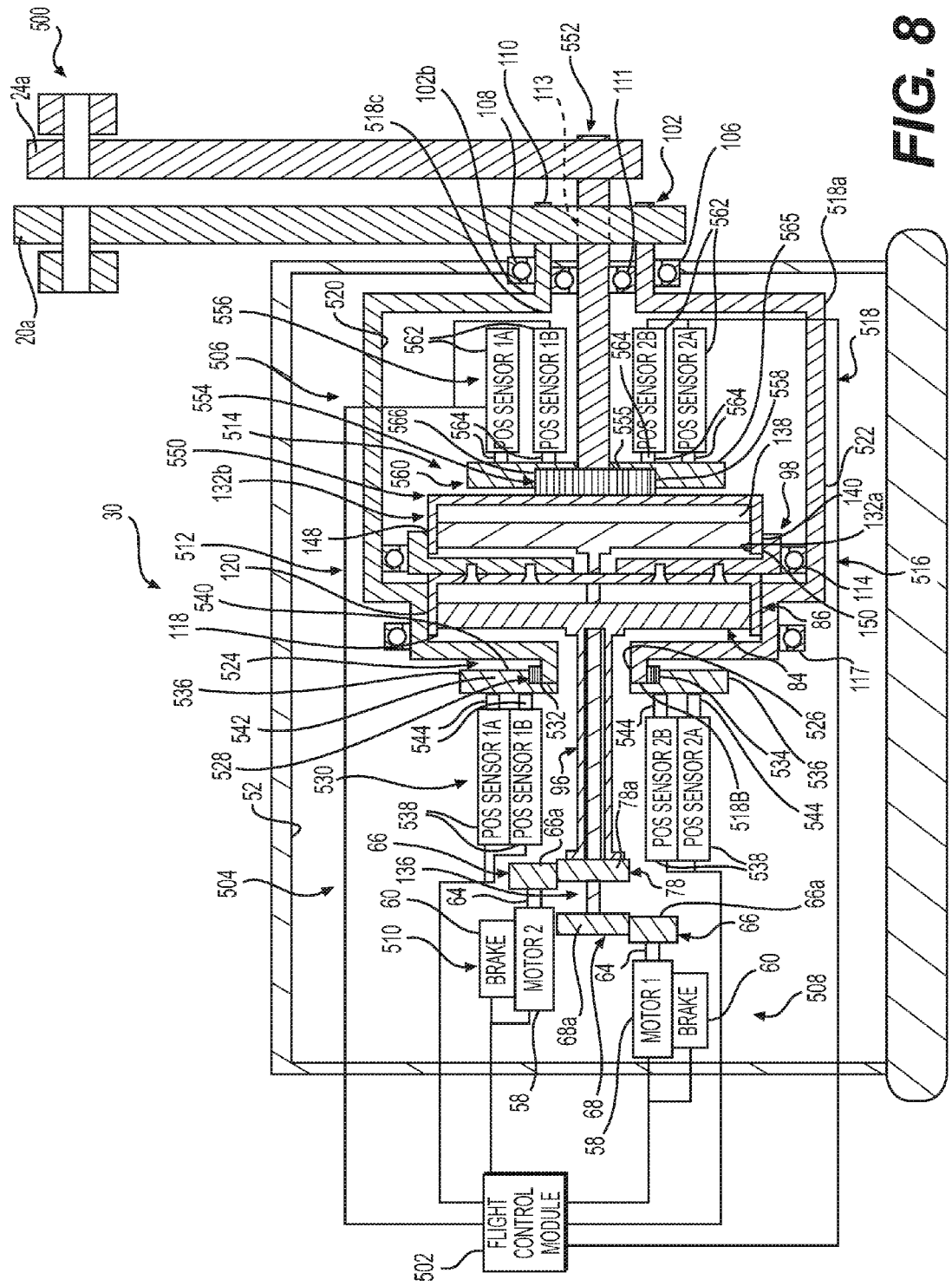
FIG. 8 is a cross-sectional illustration of another automatic actuator system for use with the automatic flight control actuator system of FIG. 1, taken along line 3-3 of FIG. 2, in accordance with various embodiments.
Figure 9A:
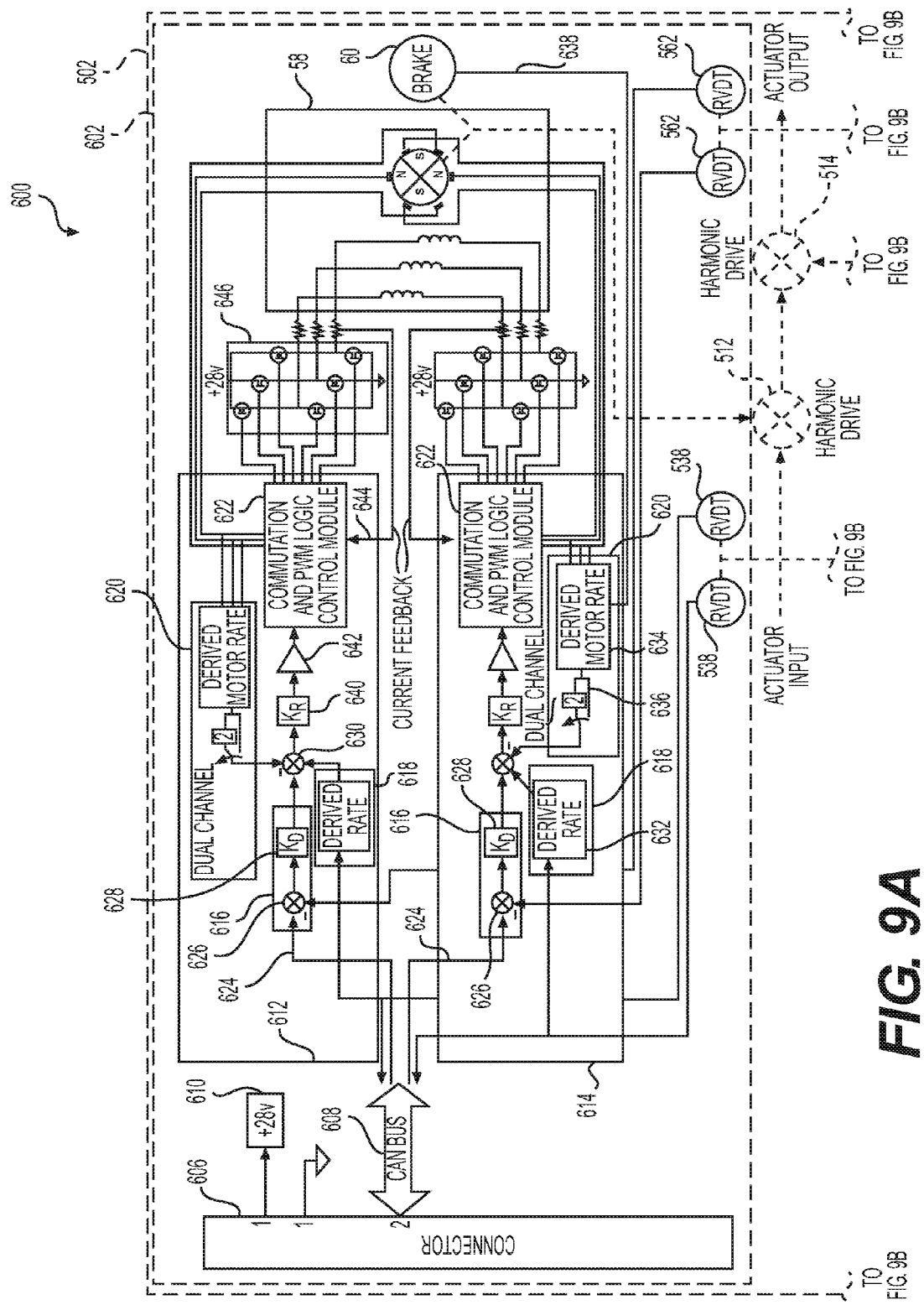
FIG. 9A is a functional block diagram of a control system for the automatic actuator system of FIG. 8 in accordance with various embodiments.
Figure 9B:
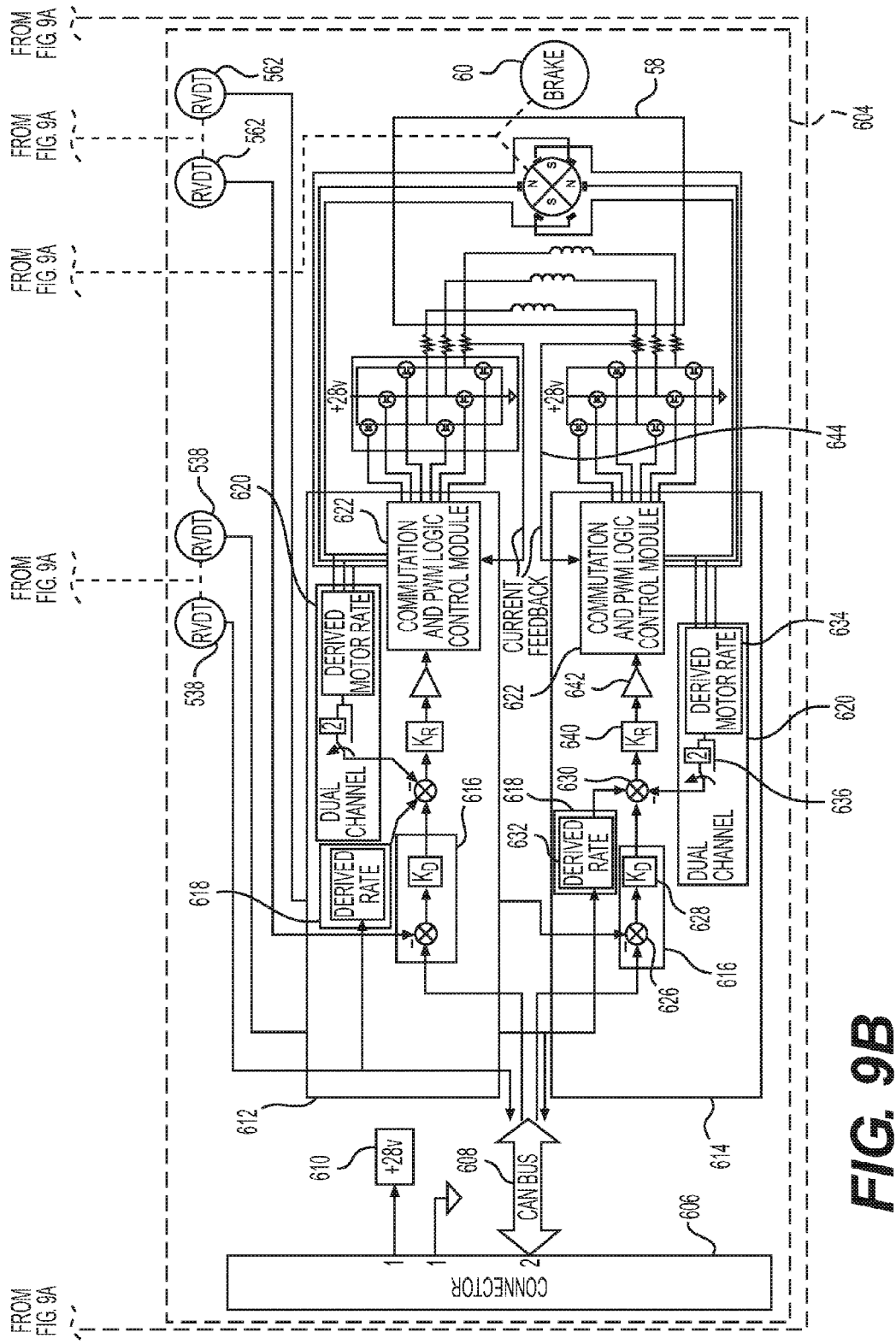
FIG. 9B is a continuation of the functional block diagram of FIG. 8.

With reference to FIGS. 9A-9B, and continued reference to FIG. 8, a functional block diagram illustrates an exemplary control system 600 for the automatic actuator system 500, which may be embedded within the flight control module 502. Various embodiments of the control system 600 according to the present disclosure can include any number of sub-modules embedded within the flight control module 502. As can be appreciated, the sub-modules shown in FIGS. 9A-9B can be combined and/or further partitioned to similarly control the motor 58 of the first actuator system 508, the brake 60 of the first actuator system 508, the motor 58 of the second actuator system 510 and the brake 60 of the second actuator system 510. Inputs to the control system 600 may be received from the plurality of sensors 538 and the plurality of sensors 562 (FIG. 8), received from other control modules (not shown) associated with the aircraft 12 (FIG. 1), received from the FMS 23, AHRS 25 and/or the IRS 27, and/or determined/modeled by other sub-modules (not shown) within the flight control module 502. In various embodiments, the control system 600 includes a first channel 602 and a second channel 604, which can be coupled to control modules or controllers associated with the aircraft 12 via respective connectors 606. The first channel 602 and the second channel 604 each communicate over a respective communication architecture 608 that facilitates the transfer of power, data, commands, etc., such as a bus or controller area network (CAN) bus. Each of the first channel 602 and the second channel 604 include a power source 610, which can be received from a source onboard the aircraft 12, such as a battery.

The first channel 602 includes a first control lane 612 and a second control lane 614. The first channel 602 generally controls the operation of the motor 58 and brake 60 associated with the first actuator system 508. The first control lane 612 includes a feedback position signal 616, a derived rate feedback 618, a motor rate feedback 620 and a computation and PWM logic control module 622.

The feedback position signal 616 is received from one of the plurality of sensors 562. The feedback position signal 616 comprises the sensor signals generated based on the observation of the rotation of the driven shaft 564 by the rotation of the gear 554 coupled to the shaft 552. The feedback position signal 616 is subtracted from an input command position signal 624 at a summation 626. The command position signal 624 is a position command received as input from the flight control module 502, and the computation and PWM logic control module 622 compares the actual feedback position received from one of the plurality of sensors 562 and drives the motors 58 so that the positions match. The resulting signal is relayed at 628 and is summed with the output of the derived rate feedback 618 at 630.

The derived rate feedback 618 receives as input the sensor signals from one of the plurality of sensors 538. The sensors signals from the one of the plurality of sensors 538 are generated based on the observation of the driven shafts 544 during the rotation of the first circular spline 516 upon receipt of input to the input linkage 20a. A derived rate control module 632 processes the received sensor signals and determines an amount of pilot input received at the input linkage 20a-d. The derived rate control module 632 computes the rate of change of the position of the input linkage 20a and commands an equivalent motor rate to allow the motor 58 to offset the input motion and allow the position of the output linkage 24a, measured by sensors 562, to follow the input command position signal 624. The determined amount of pilot input is output by the derived rate control module 632 to the summation 630.

The motor rate feedback 620 receives as input signals from the motor 58. Based on the input signals, a derived motor rate control module 634 determines a rate of speed of the motor 58. The derived motor rate control module 634 provides a motor rate feedback signal to the computation and PWM logic control module 622 to act as a damping factor and provide a well damped motor control response. In the case of an issue with one of the first channel 602 or the second channel 604, the switch 636 will switch the motor rate feedback from derived motor rate control module 634 from a gain of 2 to a gain of 1. This reduction in gain will allow the single channel control operation to match the dual channel control operation because when only a single motor 58 is operating it must run twice as fast to satisfy the position control loop response. When both motors 58 are running the total output motion is the sum of both motors 58. If an issue with a single channel is detected by the flight control module 502, the flight control module 502 will command the respective channel to turn off and the flight control module 502 will also output one or more control signals 638 to the brake 60 to activate the brake 60.

The signal from the gain block 628 is summed with the output of the derived rate feedback 618 at 630, relayed at 640 and amplified at 642 before being received at the computation and PWM logic control module 622. The computation and PWM logic control module 622 also receives as input a current 644 observed at the motor 58 from one or more current sensors associated with the motor 58. Based on the receipt of the signal and the observed current, the computation and PWM logic control module 622 processes the received signal and generates output signals for the motor 58. In this regard, the computation and PWM logic control module 622 comprises a motor position control loop, which ensures the motor 58 follows the position command received from the flight control module 502. As the first control lane 612 cooperates with the second control lane 614 to control the motor 58, the output from the computation and PWM logic control module 622 of the first control lane 612 is generally half the total required output for the motor 58 of the first actuator system 508 to arrive at half the desired output for the output linkage 24a-d (the other half of the desired output for the output linkage 24a-d is received from the motor 58 of the second actuator system 510). The computation and PWM logic control module 622 outputs the one or more control signals to the motor 58 via one or more controllable switches 646. Further details regarding the control of the motor 58 by the computation and PWM logic control module 622 can be found in U.S. Pat. No. 8,084,972, the relevant content of which is incorporated by reference herein.

As the second control lane 614 is substantially similar to the first control lane 612, the second control lane 614 will not be discussed in detail herein. Briefly, however, the first control lane 612 and the second control lane 614 cooperate to drive the motor 58 of the first actuator system 508 to rotate the first strain wave gear 512 and the second strain wave gear 514 to control the output of the output linkage 24a-d based on the received input from the input linkage 20a-d.

The second channel 604 is substantially the same as the first channel 602, and thus, the second channel 604 will not be discussed in great detail herein. Briefly, however, the second channel 604 includes the first control lane 612 and the second control lane 614. The second channel 604 generally controls the operation of the motor 58 and brake 60 associated with the second actuator system 510. Thus, the second channel 604 cooperates with the first channel 602 to control the output of the motors 58 of the first actuator system 508 and the second actuator system 510, thereby controlling the output of the output linkage 24a-d.

The use of the first channel 602 and the second channel 604, which are arranged in series, to actuate the motors 58 allows the remaining motor 58 to recover in the event of inoperability of the other of the motors 58. In the event of inoperability of both motors 58, the pilot input still transfers directly (1:1) via the coupling of the input linkages 20a-d to the first strain wave gear 512, and thus, the second strain wave gear 514 and the output linkage 24a-d. In addition, the use of the first control lane 612 and the second control lane 614 ensures that an event within one of the first control lane 612 and the second control lane 614 does not result in an incorrect motion of the respective motor 58. It should be noted that while the control system 600 is described herein as being used with the automatic actuator system 500 of FIG. 8, the control system 600 can also be used with the automatic actuator systems 16a-d of FIGS. 1-6 and the automatic actuator system 400 of FIG. 7.

As the assembly and use of the automatic actuator system 500 is substantially similar to the assembly and use of the automatic actuator systems 16a-d discussed with regard to FIGS. 1-6, the assembly and use of the automatic actuator system 500 will not be discussed in great detail herein. Moreover, it will be understood that although not illustrated herein, the automatic actuator system 500 can include the trim input system 402, as discussed with regard to FIG. 7, if desired.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An automatic actuator system, comprising:
an input linkage that receives an input;
an output linkage adapted to control a flight surface actuator;
a first strain wave gear including a first circular spline coupled to the input linkage and a first flex spline rotatably coupled to the first circular spline; and
a second strain wave gear including a second circular spline coupled to the first flex spline, the second strain wave gear including a second flex spline, and the second flex spline is coupled to the output linkage such that at least a portion of the input from the input linkage is transferred to the output linkage via the first strain wave gear and the second strain wave gear.

2. The automatic actuator system of claim 1, wherein the first strain wave gear and the second strain wave gear operate in series and the second circular spline is positioned adjacent to a cavity defined by the first circular spline.

3. The automatic actuator system of claim 1, further comprising a first actuator system, the first strain wave gear includes a first wave generator, and the first actuator system is coupled to the first wave generator to rotate the first flex spline.

4. The automatic actuator system of claim 3, further comprising a second actuator system, the second strain wave gear includes a second wave generator, and the second actuator system is coupled to the second wave generator to rotate the second flex spline.

5. The automatic actuator system of claim 4, further comprising at least one first sensor coupled to the first actuator system and at least one second sensor coupled to the second actuator system.

6. The automatic actuator system of claim 1, further comprising at least one sensor coupled to the first circular spline.

7. The automatic actuator system of claim 1, further comprising at least one sensor coupled to the second flex spline.

8. The automatic actuator system of claim 1, further comprising a trim input system coupled to the first circular spline.

9. The automatic actuator system of claim 5, wherein the first actuator system includes a first motor and the second actuator system includes a second motor, and the automatic actuator system further comprises a control module that receives and processes sensor signals from the at least one first sensor and the at least one second sensor, and generates one or more control signals for at least one of the first motor and the second motor based at least in part on the sensor signals.

10. The automatic actuator system of claim 9, wherein the first wave generator includes a first wave generator input shaft, and the first actuator is coupled to the first wave generator input shaft.

11. The automatic actuator system of claim 10, wherein the second wave generator includes a second wave generator input shaft, and the second actuator is coupled to the second wave generator input shaft.

12. The automatic actuator system of claim 11, wherein the second wave generator input shaft is received through the first wave generator input shaft and rotates independently of the first wave generator input shaft.

13. An automatic actuator system, comprising:
an input linkage that receives an input;
an output linkage adapted to control a flight surface actuator;
at least one sensor that generates sensor signals based on a movement of the input linkage;
a first actuator system that includes a first motor;
a second actuator system that includes a second motor;
a first strain wave gear including a first circular spline coupled to the input linkage and a first flex spline rotatably coupled to the first circular spline, the first strain wave gear including a first wave generator, the first wave generator coupled to the first motor to rotate the first flex spline;
a second strain wave gear including a second circular spline coupled to the first flex spline, the second strain wave gear including a second flex spline and a second wave generator, the second wave generator coupled to the second motor to rotate the second flex spline and the second flex spline coupled to the output linkage such that at least a portion of the input from the input linkage is transferred to the output linkage via the first strain wave gear and the second strain wave gear; and a control module that receives and processes the sensor signals and outputs one or more control signals to at least one of the first motor and the second motor to rotate at least one of the first wave generator and the second wave generator based on the sensor signals.

14. The automatic actuator system of claim 13, wherein the second circular spline and the second flex spline are received within a cavity defined by the first circular spline.

15. The automatic actuator system of claim 13, wherein the first wave generator includes a first wave generator input shaft, and the first motor is coupled to the first wave generator input shaft.

16. The automatic actuator system of claim 15, wherein the second wave generator includes a second wave generator input shaft, and the second motor is coupled to the second wave generator input shaft.

17. The automatic actuator system of claim 16, wherein the second wave generator input shaft is received through the first wave generator input shaft and rotates independently of the first wave generator input shaft.

18. The automatic actuator system of claim 13, wherein the first strain wave gear and the second strain wave gear operate in series.

19. The automatic actuator system of claim 13, wherein the at least one sensor is coupled to the first motor.

20. The automatic actuator system of claim 13, wherein the at least one sensor is coupled to the second flex spline.

* * * * *